United States Patent [19]

Gorr et al.

[11] Patent Number: 5,961,571
[45] Date of Patent: Oct. 5, 1999

[54] METHOD AND APPARATUS FOR AUTOMATICALLY TRACKING THE LOCATION OF VEHICLES

[75] Inventors: Russell E. Gorr, Hightstown; Thomas R. Hancock; J. Stephen Judd, both of Plainsboro; Long-Ji Lin, Kendall Park, all of N.J.; Carol L. Novak, Newtown, Pa.; Scott T. Rickard, Jr., Plainsboro, N.J.

[73] Assignee: Siemens Corporated Research, Inc, Princeton, N.J.

[21] Appl. No.: 08/364,160

[22] Filed: Dec. 27, 1994

[51] Int. Cl.⁶ .................................................. G06F 165/00
[52] U.S. Cl. .......................... 701/207; 701/200; 701/208; 701/211; 701/212; 340/988; 340/990
[58] Field of Search ............................ 701/23, 117, 200, 701/201, 205, 207, 208, 209, 210, 211, 212, 216, 217, 214; 340/988, 990, 995

[56] References Cited

U.S. PATENT DOCUMENTS

| 4,777,601 | 10/1988 | Boegli | 701/23 |
|---|---|---|---|
| 5,177,685 | 1/1993 | Davis et al. | 364/443 |
| 5,212,643 | 5/1993 | Yoshida | 364/449 |
| 5,262,775 | 11/1993 | Tamai et al. | 340/995 |
| 5,283,575 | 2/1994 | Kao et al. | 340/990 |
| 5,291,412 | 3/1994 | Tamai et al. | 364/449 |
| 5,291,413 | 3/1994 | Tamai et al. | 364/449 |
| 5,291,414 | 3/1994 | Tamai et al. | 364/449 |
| 5,303,159 | 4/1994 | Tamai et al. | 364/449 |
| 5,311,434 | 5/1994 | Tamai | 364/449 |
| 5,696,503 | 12/1997 | Nasburg | 701/117 |

OTHER PUBLICATIONS

Zhang et al., "Segment–Based Matching For Visual Navigation", Computer and Information Science, University of Massachusetts at Amherst, COINS TR91–35, pp. 1–37 (Apr. 1991).

Oh et al., "A study of the characteristics of an omnidirectional vision sensor", Advances in Image Processing, SPIE vol. 804, pp. 259–268 (1987).

Zheng et al., "Panoramic Representation for Route Recognition by a Mobile Robot", International Journal of Computer Vision, 9:1, pp. 55–76 (1992).

Hong et al., "Image–Based Navigation Using 360° Views", Proc. of Image Understanding Workshop, pp. 782–791 (1990).

(List continued on next page.)

Primary Examiner—William A. Cuchlinski, Jr.
Assistant Examiner—Gertrude Arthur
Attorney, Agent, or Firm—Adel A. Ahmed

[57] ABSTRACT

A system for automatically tracking the location of a vehicle includes a visual image detector mounted on the vehicle for producing as the vehicle moves along a route digitized strips of image data representing successive panoramic views of scenery about the vehicle at respective locations along the route. A sparse tracking subsystem processes and stores only selected ones of the image data strips representing substantially spaced apart successive locations along the route, for use as a sparse database. A dense tracking subsystem processes and stores as a dense database every successive one of the image data strips representing location along the route, whereby the dense tracking subsystem provides more accurate location of the vehicle when it retraces some portion of the route than the sparse tracking subsystem. After the sparse and dense databases are established, the location of the vehicle in real time as it retraces the route is performed by the dense tracking subsystem matching current image data strips from the visual image detector with the dense database strips to determine the location of the vehicle, as long as the vehicle stays on the pre-established route. If the vehicles strays from the route, the system senses the deviation and switches to the sparse tracking system to search a broader area in less time than the dense tracking system to attempt to relocate the vehicle along the route, after which the system switches back to the dense tracking subsystem.

38 Claims, 14 Drawing Sheets

OTHER PUBLICATIONS

Oh et al., "Guidance of a Mobile Robot Using an Omnidirectional Vision Navigation System", Mobile Robots II, SPIE vol. 852, pp. 288–300 (1987).

Yagi et al., "Panorama Scene Analysis with Conic Projection", IEEE International Workshop on Intelligent Robots and Systems, IROS, pp. 181–187 (1990).

Zipser, "Biologically Plausible Models of Place Recognition and Goal Location", Chapter 23, pp. 432–470.

METHOD AND APPARATUS FOR AUTOMATICALLY TRACKING THE LOCATION OF VEHICLES

RELATED APPLICATIONS

This application is related to co-pending applications Ser. No. 08/364,879 (Attorney Docket No. 94E7541), entitled "Omnidirectional Visual Sensor and Processor", filed on Dec. 27, 1994; and Ser. No. 08/364,885 (Attorney Docket No. 94E7618), entitled "Discoidal Visual Image Detector", filed on, Dec. 27, 1994; and Ser. No. 08/364,880 (Attorney Docket No. 94E7617), entitled "Visual Incremental Turn Detector", filed on, Dec. 27, 1994. The teachings of the co-pending applications are incorporated herein by reference to the extent they not do conflict with the teachings herein.

FIELD OF THE INVENTION

The field of the present invention is generally related to navigational systems for vehicles, and is more particularly related to systems for tracking the location of vehicles such as robotic vehicles, automobiles, trucks, buses, and so forth.

BACKGROUND OF THE INVENTION

The increasing demand on the world's transportation capacity has led to a concerted effort by government and industry to develop an Intelligent Transportation System (ITS) for the future. Many such systems require Automatic Vehicle Location (AVL) to continuously pinpoint a vehicle's location on the roadways (or rail lines, etc.). An inexpensive, reliable, and accurate system for AVL is the key to applications such as personal navigation, centralized traffic monitoring, and public transportation control and dispatching.

Current proposals for AVL systems are based primarily on either the U.S. government's satellite-based Global Positioning System (GPS) or on transmitting beacons placed throughout the city (e.g. the Bosch/Blaupunkt and Siemens ALI-SCOUT system).

A common first step to automatic vehicle location (and other navigation problems) is dead-reckoning. Dead-reckoning estimates position by starting at some known initial location which is blindly updated according to the distance travelled, as measured by the odometer and the steering angle measured by a directional sensor. An odometer is a cheap and accurate sensor available in virtually any vehicle. Gyroscopic devices to measure turning angles (and hence help to decide which branch in a road is followed) are slightly more problematic, but can be implemented. The key obstacle to a system based entirely on dead-reckoning is the slow but inevitable accumulation of errors that the system cannot correct.

The use of omnidirectional vision navigation systems for providing video information useful in robot navigation, or for the location of mobile systems, is known in the art. For example, Zhongfei Zhang, Richard Weiss, and Edward M. Riseman, presented a paper on Apr. 3, 1991, entitled "Segment-Based Matching for Visual Navigation", *Computer Information Science Department, University of Massachusetts*, Amherst, Mass., "COINS PR91-35". The paper describes the use of a reflecting globe or spherical mirror, mounted on top of a mobile robot above a camera. The camera converts the picture received to a 360° video image of the surrounding environment. The video image from the camera is processed for obtaining a fixed set of target locations for permitting a robot to navigate between desired locations by carrying out a sequence of homing tasks relative to the target locations. The 360° view taken at a given time is condensed into a 1-dimensional location signature. Correlation techniques are used for providing matching between location signatures in navigating the robot. The location signature is represented by three types of segments identified as increasing, decreasing, and constant, respectively. In the system, a "horizon circle" is superimposed upon the 360° image for taking a sample of the image every degree, that is taking 360 samples. The "horizon circle", together with the X and Y axes, is characterized as forming a circular band composed of 360 ticks. The circle is designated as being the actual horizon circle, with each tick being a sample thereof, as a function of the azimuth orientation. The resultant sequences of linear segments obtained are not all used for matching, whereby selective ones are obtained for providing "characteristic features" for matching between images, and navigating a robot to move from one image location to a next, in a successive manner. Each 360° video image is processed using a spherical coordinate system centered upon the origin of the image plane. The "characteristic features" chosen for matching are those which appear to be most distinctive and reliable for such use, for example parts of the processed waveform having a large slope for feature transition.

Another paper by Sung Jun Oh and Ernest L. Hall, entitled "A Study of the Characteristics of a Omnidirectional Vision Sensor", was published in SPIE, Volume 804 of *Advances and Image Processing* in 1987, on pages 259 through 267. The detector of the system includes a fish eye lens mounted over a video camera, for projecting a 360° image of its surroundings. The video camera consists of a CCD or charge coupled device camera for providing a video signal representative of the 360° image to an image processing system.

Another known system for providing route recognition in robot navigation includes the use of a rotating slit in combination with a video camera for providing a video image band representative of a panoramic view of the environment a robot is to navigate. As the rotating slit camera apparatus is moved linearly the panoramic view changes. Successive 2D panoramic image strips are connected together for providing a continuous panoramic view relative to a robot moving through the chosen environment. The images are processed through use of circular dynamic programming to obtain vertical line segments from the images for use in matching techniques for guiding the robot as a robot's movement. The robot's signal processor compares its present panoramic view with recorded panoramic views in order to determine the robot's heading, and correct the same if it is off course. See J. Y. Zheng and S. Tsuji, "Panoramic Representation for Route Recognition by a Mobile Robot", *International Journal of Computer Vision*, Volume 9:1, pages 55–76 (1992), Kluwer Academic Publishers, The Netherlands. All of the above work relies on geometric modelling.

Prior vehicle location systems include some based upon the satellite Global Positioning System (GPS), which tend to function well in rural environments, but also tend to fail when applied for use in dense urban environments. Prior vehicle location systems tend to be relatively complex, expensive, and at times unreliable.

Also, the above-described prior omnidirectional vision navigation systems partly based upon taking panoramic views of surroundings associated with a route that a robot may travel, encounter further problems when operated outdoors because of environmental changes. For example, such changes may cause images taken at the same location but at different times during a day to differ dramatically, on a pixel-by-pixel basis. Illumination conditions vary throughout the day and night depending upon cloud cover, pollution, other weather conditions, seasons of the year, and so forth. Also, illumination often is not uniform across a given image. The sun may create glare in an image. Trees, buildings, and clouds may create shadows during the daytime, or even at night with artificial illumination. Also, portions of an image may be either under-illuminated or over-illuminated. Trees and buildings may be altered over the course of time, or over various seasons where the deciduous trees may lose their leaves, or sprout new leaves. Also, trees and shrubbery may be pruned, cut down, or simply fall down, at unpredictable times. Likewise, buildings or other structures may be erected or torn down from time to time. Night time imaging also presents major problems due to changing traffic lights, street lights, lights for buildings, and so forth, creating features that may or may not be usable for landmark recognition. Typically, such features due to light sources are not reliable in that traffic lights change color periodically, street lamps may burn out, and new lighting systems may be installed in different areas. Accordingly, vision-based systems must be able to operate reliably despite all of the aforesaid problems.

The capabilities of the prior omnidirectional vision navigation systems are also very limited. These systems operate on a predefined route. The route cannot have decision points, i.e., intersections. If the robot or the vehicle happens to go astray from the pre-defined route, these systems stop operating, even when the robot just goes astray for a short period of time and comes back on route again. These system do not have capabilities to recover from large errors. In fact, they probably don't know when errors occur.

SUMMARY OF THE INVENTION

An object of this invention is to provide an improved method and apparatus for use in automatic vehicle location systems, and robotic navigational systems.

With the problems of the prior art in mind, an automatic tracking system for locating vehicles while moving or stopped, is provided by securing an omnidirectional visual image detector means to the vehicle, for obtaining an image signal representative of a horizontal view of the surroundings at a given elevation, that is a panoramic view of up to 360° about a reference point associated with the vehicle. Digital signal processing means provide digitized image information representative of the average intensities of pixels within successive bins formed into a ring area superimposed on the detected image plane, while discarding other image information not within the specified ring area, for effectively compressing the image information (see FIGS. 5 and 6). The vehicles such as a car, bus, truck, or robot, for example, are driven or moved through a given network of roads or route while the present system is continuously extracting and storing in memory the image information, for subsequently identifying target locations. When the vehicle is subsequently driven or moved through the same network of roads, processing means are used to compare image data being extracted from the omnidirectional visual image detector with the previously stored image information, for matching a stored target identifiable with a given location with the incoming image information, for providing the lineal position of the vehicle in one embodiment, and the position and heading of the vehicle in another embodiment, in real time. Visual gyro means are also included in the system in another embodiment of the invention for providing real time tracking of a vehicle that is making a turn, or that is deviating from lineal or straight line movement.

In yet another embodiment of the invention, sparse tracking means is used to reduce the data storage requirements, while permitting the tracking or locating of a vehicle between targets or landmarks that are reasonably spaced from one another.

In another embodiment of the invention, image preprocessing means are provided for extracting a small set of features from an input image, which features have been identified as being relatively invariant over a nominal range of environment changes. Also, local histogram modification means are employed for enhancing and normalizing such image features, to reduce the problems associated with uniform and non-uniform illumination changes. Neural-network means are included for learning which image features are more reliable than others, which features do not vary greatly with environmental changes, and which carry significant information for repetitive recognition of the place where the feature occurs along a roadway. Once such features are identified, reliability weights are assigned to each feature for prioritizing the same on a reliability scaling. In this manner, large environmental changes are dealt with. However, whenever a major environmental change or changes occur, such as the tearing down of a building or toppling of a tree, the neural-network means are retrained with data collected from the new image environment created.

BRIEF DESCRIPTION OF THE DRAWINGS

Various embodiments of the present invention are described in detail below with reference to the accompanying drawings, in which like items are identified by the same reference designation, wherein.

DETAILED DESCRIPTION OF THE INVENTION

Figure 1A:
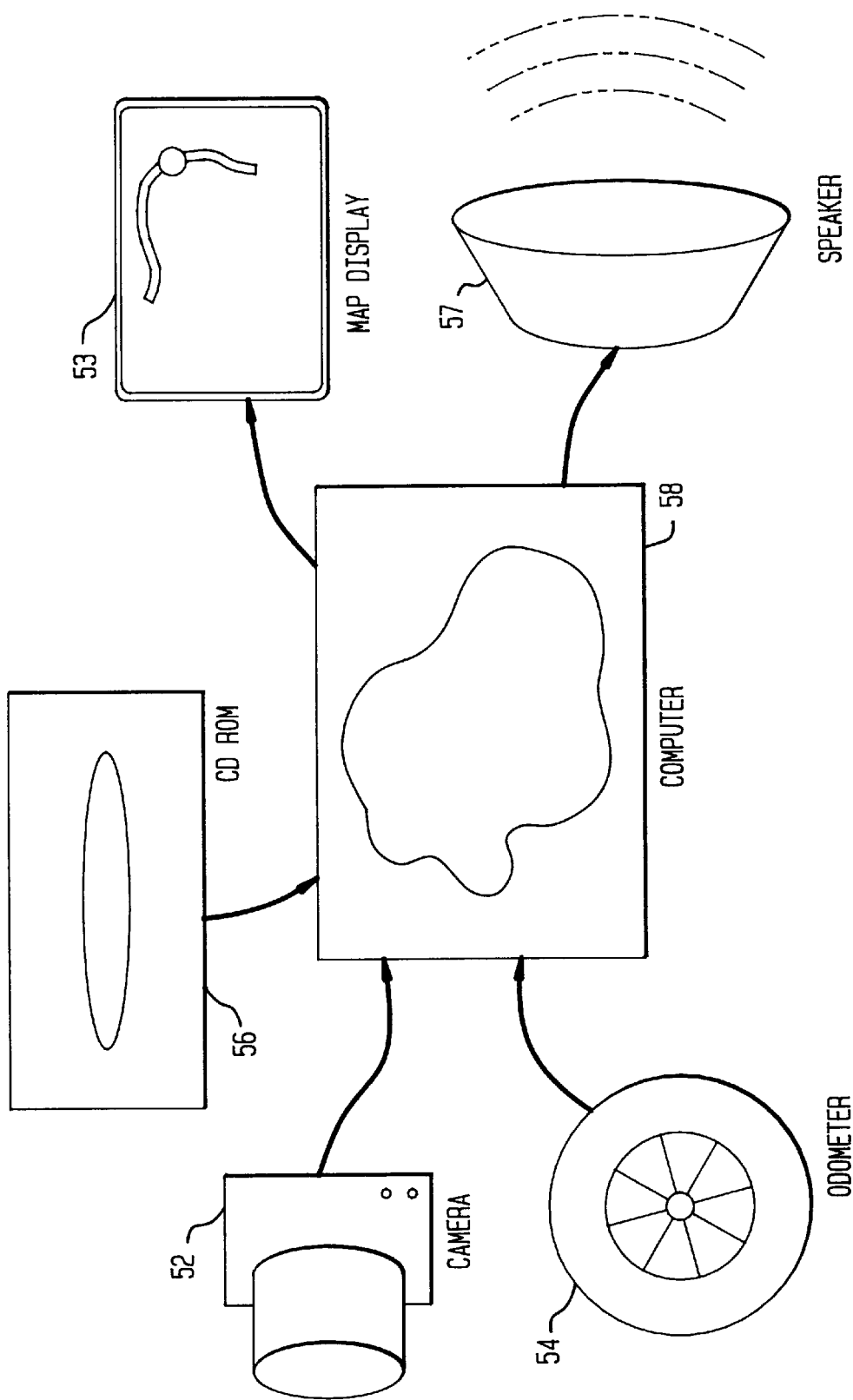
FIG. 1A is a simplified block schematic and pictorial representation of one embodiment of the invention.
Figure 16:
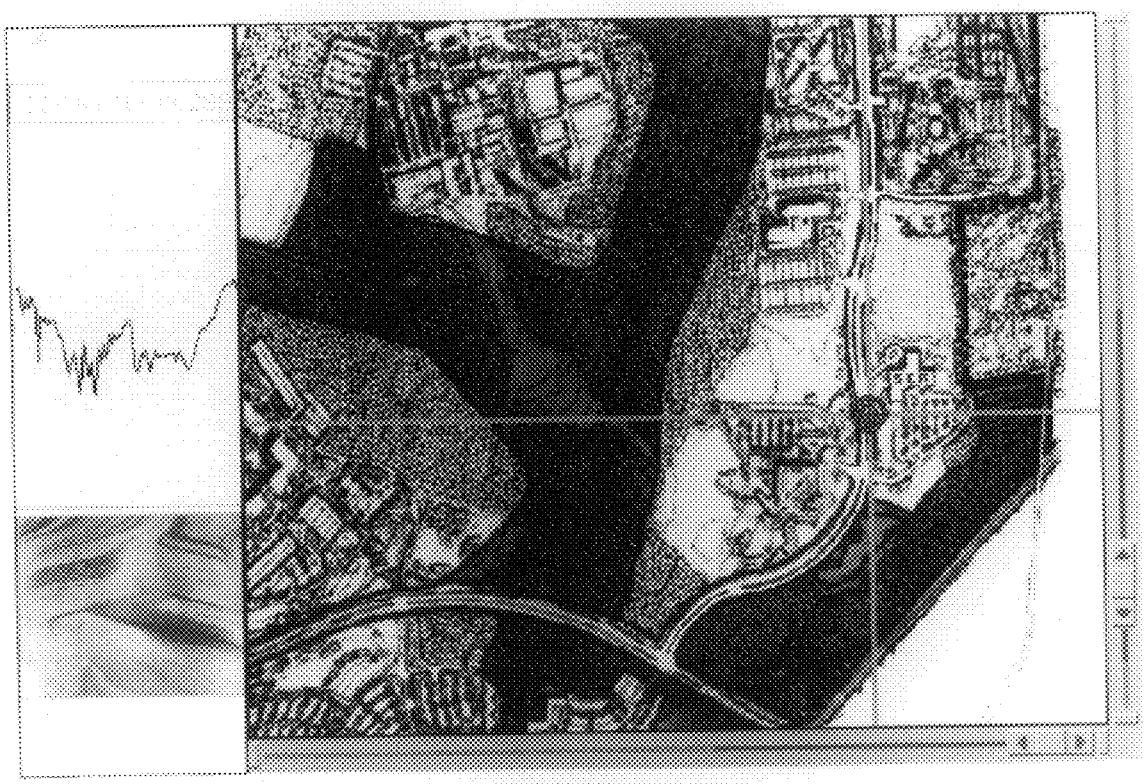
FIG. 16 shows an example of a display shown on a video monitor as obtained in real-time from a prototype system including embodiments of the invention.

With reference to FIG. 1A, a simplistic pictorial representation of a system of one embodiment of the invention for installation in a vehicle is shown. Included in the system are a visual image camera 52 or optical detector, an odometer 54, a CD ROM 56 or other storage device, a computer 58, perhaps a display or video monitor 53 for showing a map display, and/or an audio system 57 represented by a speaker. The odometer 54 can either be an independent odometer, such as the typical odometer wheel installed on vehicles for very accurately tracking the distance travelled by the vehicle, or can be a specialized odometer that is also part of the vehicle odometry system. The visual image camera 52 is in a preferred embodiment of the invention of a unique and novel design, as described in detail below. The CD ROM 56 is a typical off-the-shelf ROM for storing on a computer disk digitized information. The display 53 includes a scrolling digitized road map, as shown in FIG. 16, on which the associated vehicle's position is displayed for a real-time prototype system incorporating various embodiments of the invention. Also, the CD ROM 56 may be used to store digitized video information representing target locations of image data obtained by driving an associated vehicle over a known course in which it is desired to accurately locate a vehicle during its subsequent trips over or within the same roadway. The computer or microprocessor 58 is programmed for processing with the appropriate algorithms the odometer data obtained from odometer 54, and visual image information obtained from camera 52, along with previously recorded data obtained from the CD ROM 56, for operating both the map display 53 to show the location of a vehicle thereon, and the audio system or speaker 57 to tell a driver of a vehicle when to turn, and which way to turn, in order to stay on a predetermined route, and/or to periodically provide a driver with an announcement of the vehicle's location.

Sparse and Dense Tracking

For purposes of this invention, sparse tracking is defined as an embodiment utilizing a minimized number of landmarks for providing a more robust but less accurate system than a dense tracking embodiment described in greater detail below. Dense tracking is an embodiment using more memory to represent a greater number of landmarks than the sparse tracking embodiment. The sparse tracking embodiment is compiled by using multiple views of the same landmark. The sparse tracking embodiment may take more journeys of the vehicle over the route to assemble the database than the dense tracking embodiment.

Figure 1B:
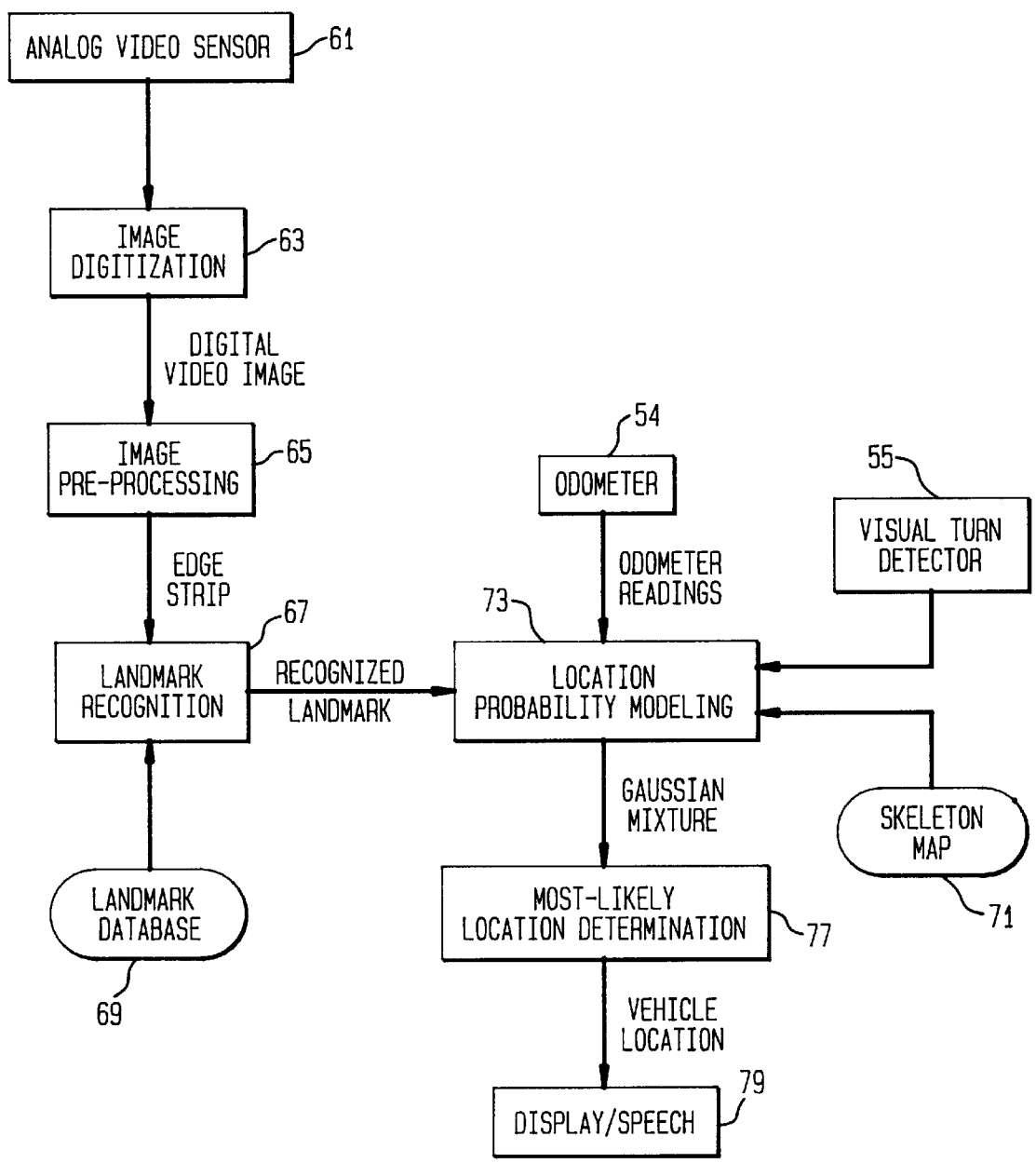
FIG. 1B is a block schematic diagram showing a sparse tracking embodiment of the invention.
Figure 1C:
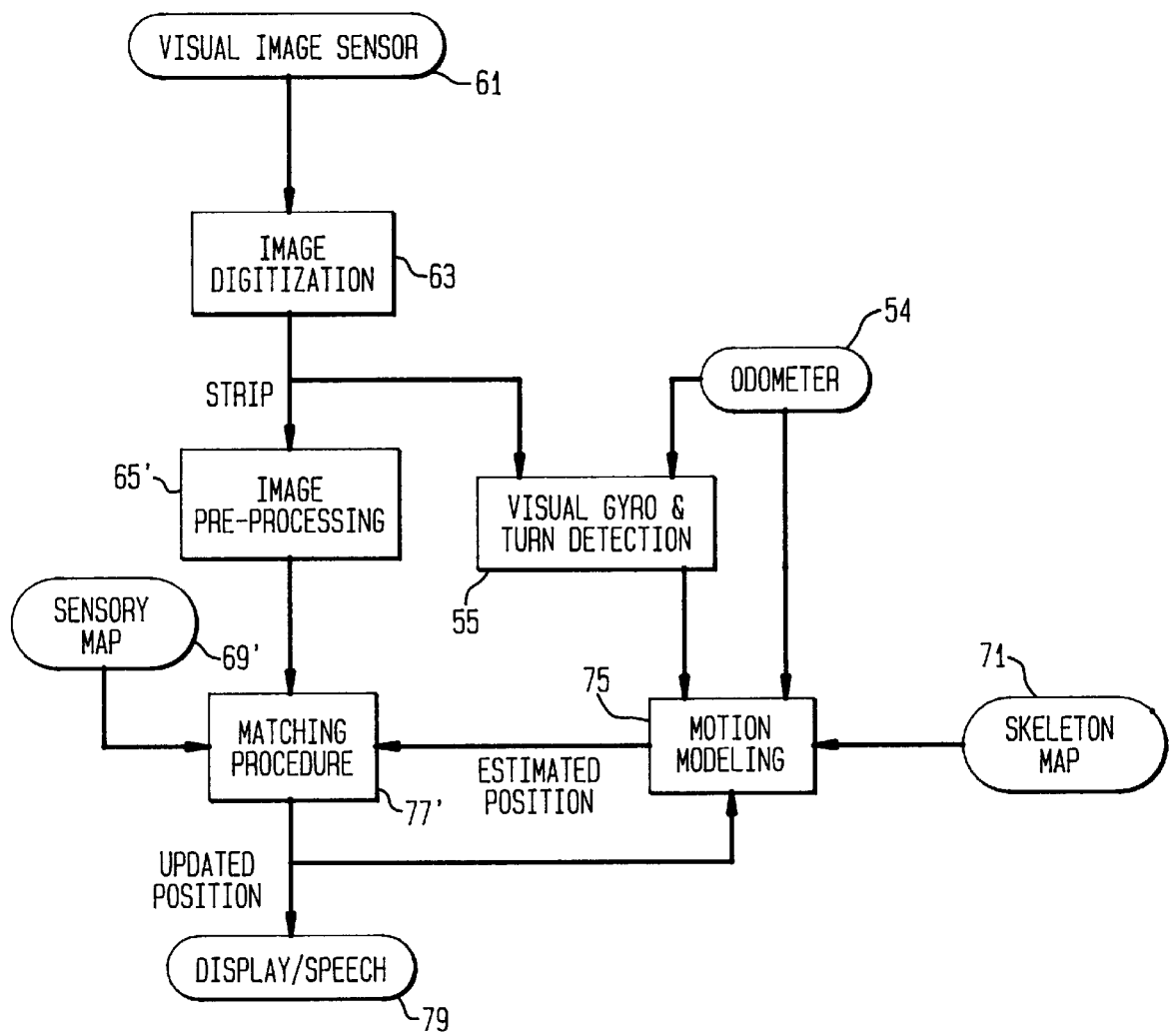
FIG. 1C is a block schematic diagram showing a dense tracking embodiment of the invention.

In this example, dense tracking requires about 120 bytes of image data per meter of road, whereas sparse tracking requires 122 bytes per landmark of image data per 60 meters of road. FIGS. 1B and 1C show sparse and dense tracking flowcharts, respectively, which are described in detail in later sections.

From a general view of the operation of the present system, for a given network of roads or route over which a vehicle is to be tracked, one must build a database. This is accomplished by driving the vehicle over the route while recording the visual panoramic images at a given elevation about the vehicle. As will be described in detail below, the images are recorded as successive strips of digitized data. Each image data strip represents the scenery about the vehicle at a particular point or location along the road or route being travelled. As each strip is taken, an odometer reading is recorded, to provide information as to the distance of the associated location from a starting point and/or the last identified location. For the sparse tracking embodiment particular ones of the image data strips are selected for use as landmarks or targets in locating a vehicle as it travels over the route. To obtain the desired target definition for sparse tracking, the vehicle may have to travel the route multiple times in building the sparse database. In this example, the sparse tracking embodiment includes an individual neural network for each selected landmark. Each neural network is trained to recognize the image data strip associated with the landmark. After such training, it is the neural networks, not the image data strips that are stored in and comprise the sparse tracking database.

The dense tracking embodiment of the invention typically only requires the collection of successive image data strips from one run of the vehicle over the network of roads. Successive image data strips are collected at 1 m intervals to form the dense tracking database. Each of the dense tracking image data strips typically have fewer bytes defining the strips than the sparse tracking image data strips, as will be shown in detail below. However, the dense tracking embodiment requires a substantially larger database, and therefore greater memory storage space than the sparse tracking embodiment since it stores one strip per meter as opposed to one set of weights per 60 meters, for example. For each embodiment, branching and/or intersection data in correspondence with a road map is included in the respective databases.

Once the sparse and dense databases have been established, the system is ready to track the location of the vehicle as it retraces travel over some portion of the route. Note that in both establishing the database, and in actual tracking, the system includes an odometer for dead reckoning input data, as mentioned above. Before beginning actual tracking, the system is initialized by inputting the appropriate starting point on a skeleton map of the route. As the vehicle begins moving tracking is initiated in the dense tracking mode, in this example.

In the dense tracking mode, before the vehicle begins moving, a current image data strip processed by the system is compared with the successive stored image data strips in the dense database. Also, the vehicle's position is updated according to the odometer reading, when the vehicle does begin moving, for dead reckoning or motion modeling purposes. However, because of inherent errors in the odometer reading, visual image data is expected to be more accurate over a long period of time. In this example, gaussian equations are used to compute the probabilities for all matches between a current image data strip and each image data strip in the dense database, to determine the closest stored image data strip. All low probability strips in the database are forced to zero value, and eliminated. Database image data strips that have a high probability value to match a current image data strip are retained. As the vehicle begins movement, new probability distributions are generated using the current image date strip as it changes due to the vehicle location changes. Also, the present odometer reading is probability modeled to be weighted with the vision probability score. The probability associated with each location's score for matching with the current image data strip being detected by the system, is multiplied with the motion-modeling probability score, to obtain a new probability distribution for the vehicle's location.

If for some reason the vehicle strays from the route or from a skeleton map of the route, the system includes switching means for detecting this and changing to the sparse tracking mode. In sensing such off route travel, the system is programmed to look for a non-turn where a turn should occur, or a turn where it should not occur, to switch from dense to sparse tracking. The sparse tracking mode provides more rapid processing than the dense tracking mode, for searching a wider area in a shorter time for a recognizable landmark, if any. As a result, the sparse tracking mode permits the vehicle to more quickly move back onto the route or skeleton map by rapidly identifying landmarks. Gaussian modeling adds to the robustness thereof. As long as no landmarks are identified, the system navigates by using odometer readings and dead reckoning. Regardless, sparse tracking continues until a number of successive landmarks are recognized, and then the system switches back to dense tracking. The system stays in the dense tracking mode, for providing more accurate determinations of the location of the vehicle.

Omnidirectional Visual Image Detector

The video camera 52 as previously generally represented, is in a preferred embodiment of the invention provided by an omnidirectional visual image detector and processor, which will now be described in detail with reference to FIGS. 2 through 14. As shown in the simplified pictorial illustration of FIG. 2, in one embodiment of the invention up to a 360° panoramic picture of the horizontal surroundings of an object at a given elevation is obtained by reflecting light rays 2 from the surroundings off of a reflective spherical or cone-shaped reflective means 4, in this example. The resultant 360° image is reflected through a focusing lens 6 to a camera or visual image detection means 8 mounted on a base member 10. A protective housing 12 encloses the apparatus, whereby the housing 12 has sufficient transparent areas or windows for permitting necessary light to travel to the reflective means 4. The reflective means 4 may be rigidly mounted to the top 14 of the housing 12. More specifically, in a conception of a design of the invention, the housing 12 is transparent, at least above the lens 6 in the area surrounding the reflective means 4. In this example, the reflective means 4 is a hemisphere having a reflective coating, such as a mirrored coating. Both the lens 6 and the reflective hemisphere 4 can consist of injection molded plastic material. In this example, a charge coupled device (CCD) optical detector array chip 16 is rigidly mounted below the other side of lens 6 away from the reflective hemisphere 4, for receiving reflective images therefrom. CCD 16 converts the reflected image into an electrical video signal representative of the image. The CCD chip 16 is mounted on a printed circuit (PC) board 18. Also mounted on the PC board 18 is a video signal processing chip 20, as shown. The inventors believe that the length $L_1$ of a practical strip extractor device from FIG. 3 can be as small as six centimeters. However, depending upon the application, larger or even smaller such devices may be required.

Figure 4A:
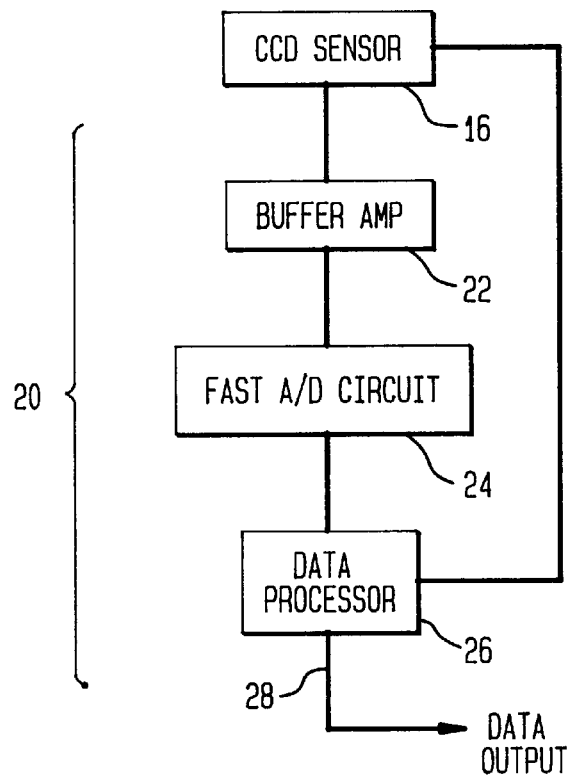
FIG. 4A is a simplified block schematic diagram of the embodiment of the invention of FIG. 3.
Figure 4B:
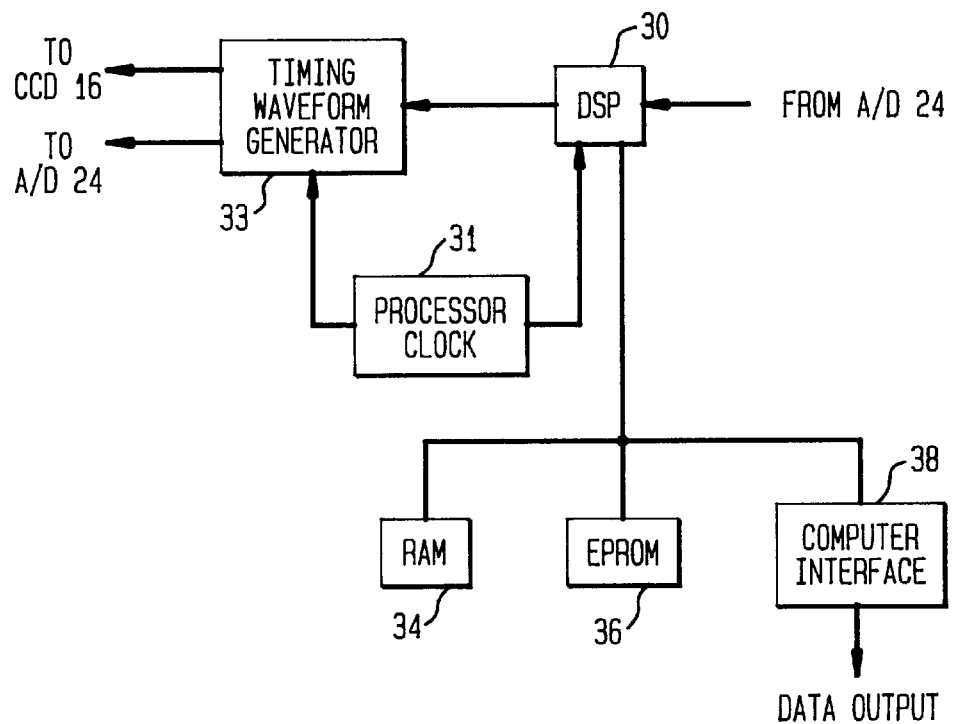
FIG. 4B is a block schematic diagram of the data processor of FIG. 4A.
Figure 4C:
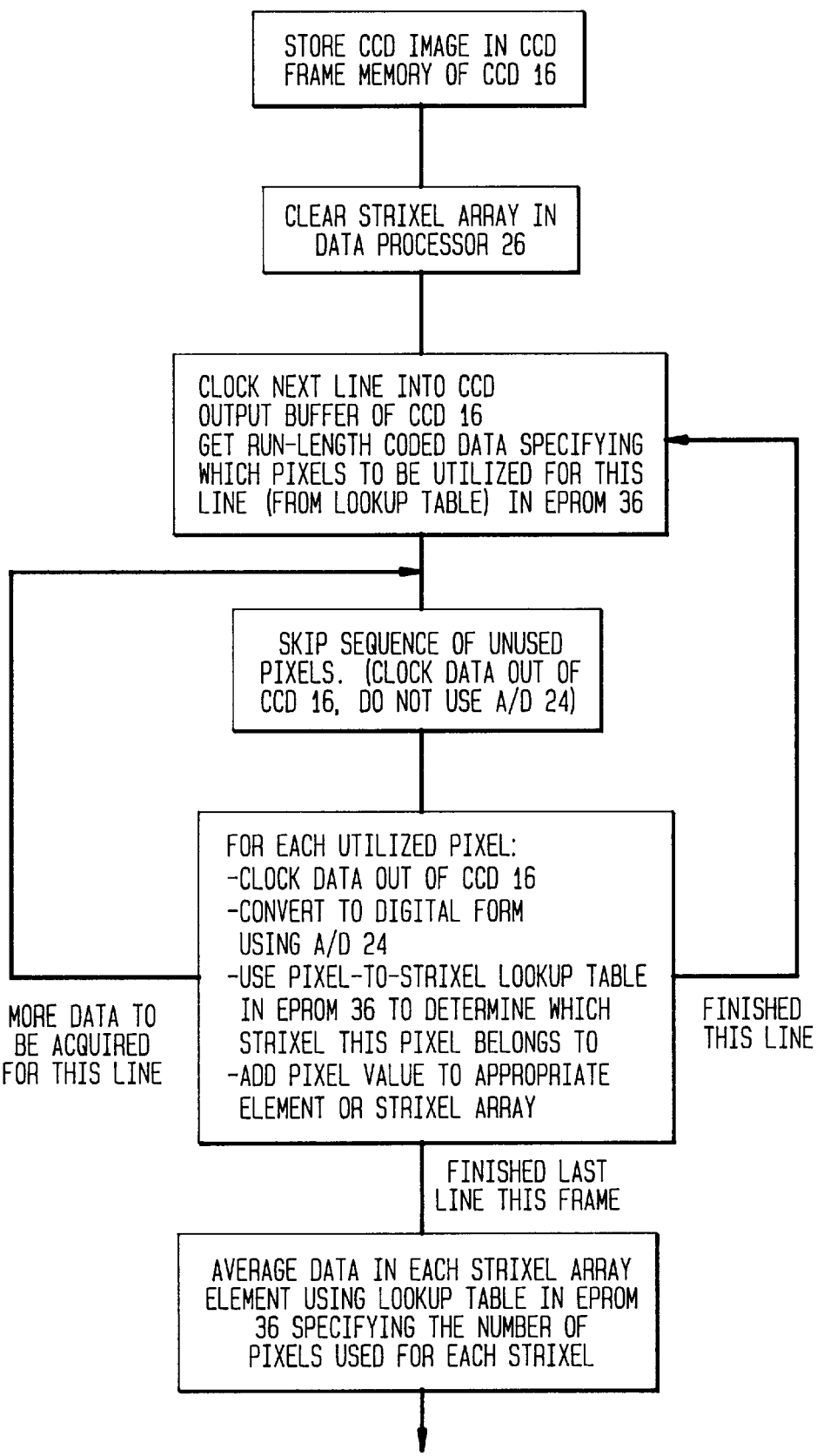
FIG. 4C is a flowchart for one embodiment of the invention, for processing or acquiring the image data.

With reference to FIGS. 4A, 4B, and 4C the basic electronics for one embodiment of the invention will now be described. The CCD sensor 16 is connected through a buffer amplifier 22 to an analog-to-digital A/D circuit 24 for converting the image information from an analog signal to a digital signal, for processing by a data processor 26. The data output from data processor 26 is interfaced 28 to a central processor unit CPU (not shown), for example, for use with algorithms to determine navigational parameters and controls for both indoor and outdoor vehicles, such as robots, or for vehicle locator systems.

A block diagram of the data processor 26 is shown in FIG. 4B, and includes a digital signal processor chip (DSP) 30, a random access memory (RAM) 34, an erasable programmable read only memory (EPROM) 36, and a computer interface 38. In a conception of a design for one embodiment of the invention, the various components used will now be identified via part number and manufacture, where applicable. The CCD sensor 16 consists of an approximately ⅓ inch CCD sensor or array, Part No. TC2XX FAMILY, manufactured by Texas Instruments, Inc., Houston, Tex. Note that the TC2XX requires clock drivers manufactured by Texas Instruments, Inc. The focusing lens 6 is typically provided by a convex lens of appropriate focal length. The reflective hemisphere 4 is 1.25 inches in diameter. The approximate distance between the lens 6 and the bottom of the hemisphere 4 is about 0.75 inch. The hemisphere 4 is rigidly mounted in the center of a 2.5 inch diameter disk 14. The cylindrical housing 12, in this example, consists of Lexan®. Lexan® is used because it exhibits less distortion then polystyrene, for example, of surrounding light passing therethrough to the hemisphere 4.

The buffer amplifier 22 can be provided by any integrated circuit providing appropriate impedance matching, level shifting and scaling of pixel data, between CCD 16 and A/D 24. The A/D 24 may be provided by a Part No. MP87XX, manufactured by MicroPower Systems, Santa Clara, Calif. The digital signal processor chip (DSP) 30 is provided by any of a family of Part Nos. TMS320C family, manufactured by Texas Instruments, Inc., Houston, Tex. The RAM 34 may be an integrated circuit Part No. Cy7CXXX Family, manufactured by Cypress Semiconductor, San Jose, Calif. The EPROM 36 may be an integrated circuit Part No. TMS27CXXX family, manufactured by Texas Instruments, Inc. The computer interface 38 can be provided by an appropriate driver or buffer amplifier for transferring image data to the computer 58. Also, a typical regulated power supply (not shown), for supplying DC voltages can be used.

Operation of various embodiments the present invention will now be described in greater detail.

Figure 2:
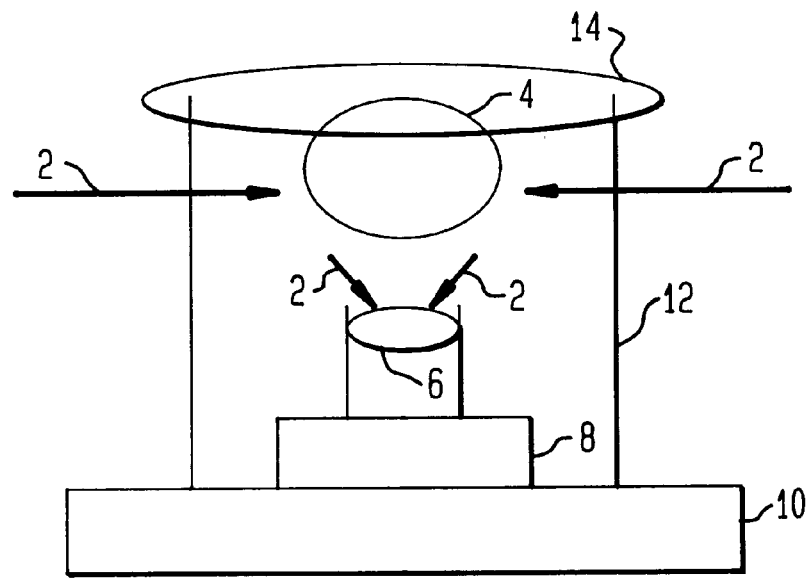
FIG. 2 is a simplified pictorial representation of another embodiment of the invention.

The omnidirectional visual image detector of FIG. 2 can be oriented as shown with the hemispherical reflective ball 4 pointed upward, for permitting the assembly to be installed on top of a vehicle, to provide strip mapping of the total surroundings about the vehicle as it is driven over a selected route. Alternatively, the assembly of FIG. 2 can be placed inside of a vehicle by orienting the assembly so that the hemisphere 4 is pointing downward, to also provide the strip mapping.

Figure 3:
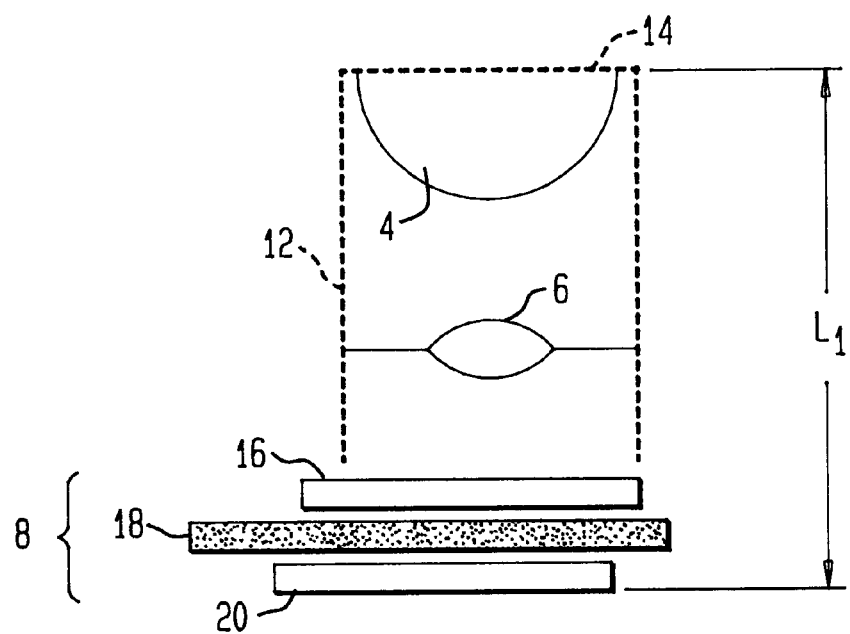
FIG. 3 is a pictorial representation of components used in an engineering prototype of the embodiment of the invention of FIG. 2.
Figure 5:
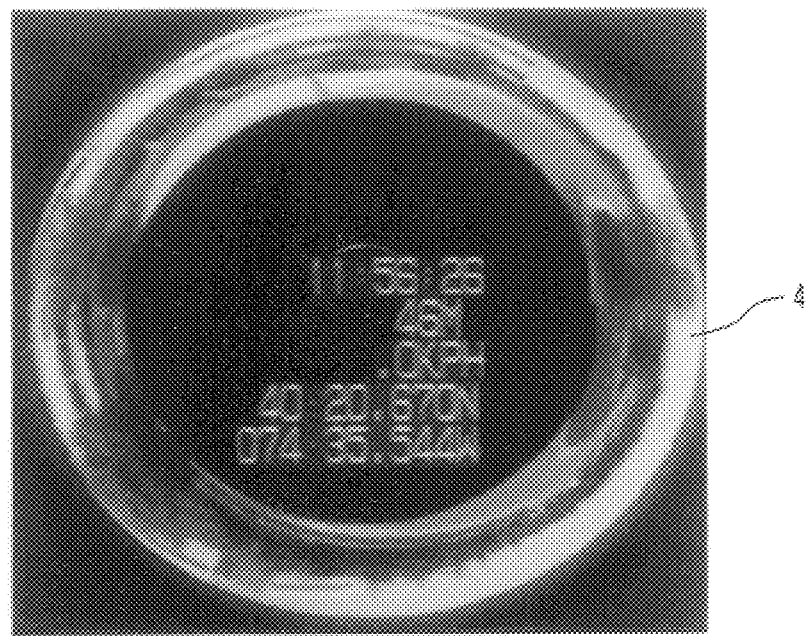
FIG. 5 is a photograph of a sample image viewed by a visual image camera in association with the embodiment of the invention of FIGS. 2 or 3.
Figure 6:
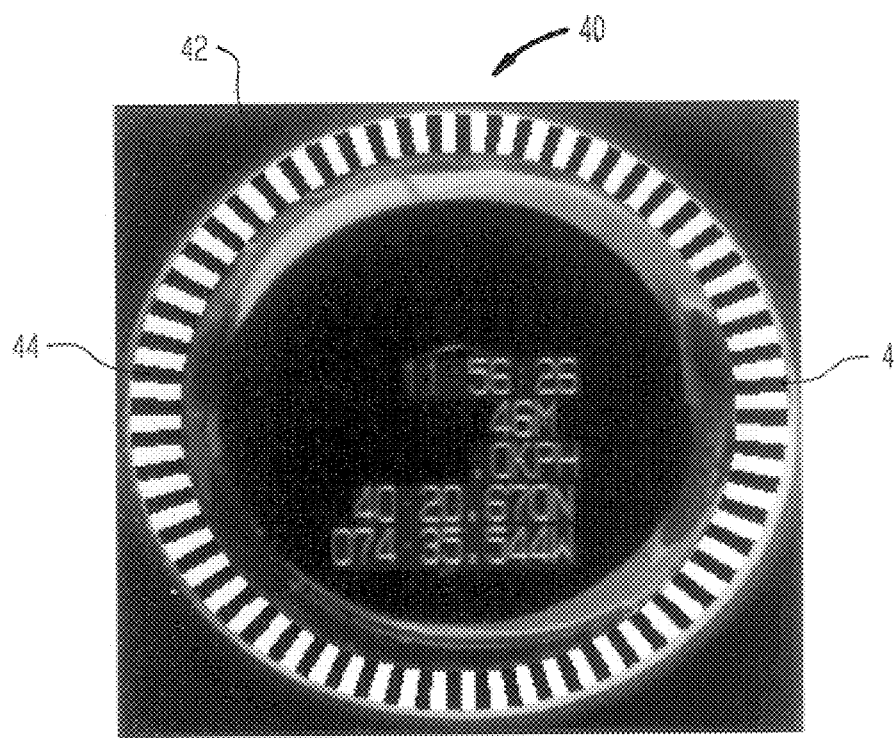
FIG. 6 illustrates a circular band of pixel locations extracted from the image of FIG. 5, for effectively compressing the video data representation of a 360° picture, in this example, of the horizontal surroundings at a given elevation and location of an associated vehicle or robot, for an embodiment of the invention.

Assume that the detector assembly of FIG. 3 is mounted vertically, whereby the reflective hemisphere 4 is positioned for receiving up to a 360° panoramic picture of its horizontal surroundings at a given elevation. The images from the reflective hemisphere 4, in this example, are reflected through lens 6 for focusing on the CCD array 16. A sample of an image so projected is shown in FIG. 5, looking upward from the lens 6 at the reflective hemisphere 4. The CCD array 16 converts the light images into a video information signal or "pixel information". Note that the horizontal view of the surroundings reflected from hemisphere 4, as shown, are represented by a circle of information appearing on the image plane. The width of the circle is dependent on the elevation and amount of horizontal picture required for the particular application. The resultant video or image ring 40, as shown in FIG. 6, is mapped to pixel locations represented by the alternating white 42 and black 44 radial segments of video or image ring 40. Note that the image information of ring 40 is divided into equal radial segments, with each segment representing a certain angular displacement from the front of the picture.

Figure 7:
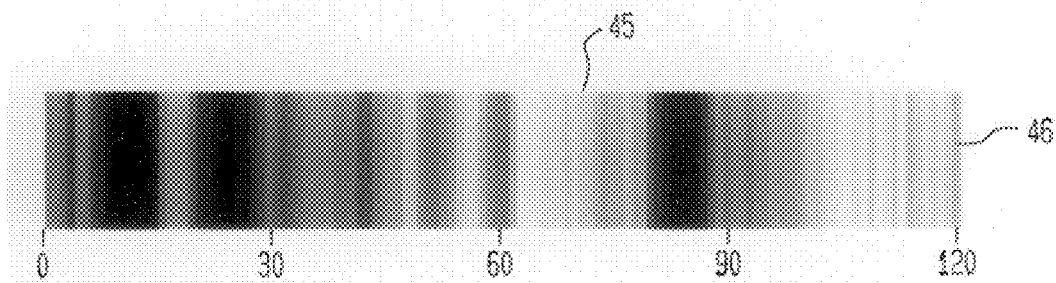
FIG. 7 shows an example of a strip of 120 pixel locations extracted from the picture or image of FIGS. 5 and 6, for an embodiment of the invention.

With reference to FIG. 4A, the image information from CCD sensor array and circuit 16 is passed through a buffer amplifier 22 to the fast A/D converter circuit 24 (three may be required for color), for converting the information from an analog signal into digital signals. The digitized image information is then processed by the data processor 26 for extracting digital data representing the relative intensities of the pixel locations within the image ring 40. All other video information not within image ring 40 is discarded, resulting in a compression of the image data. An example of a data strip extracted from the pixel locations of video ring 40 is shown in FIG. 7. The extracted data represents the relative intensity (contrast) of light at each of the 120 pixel locations, in this example. The strip extraction process is described in greater detail below.

With further reference to FIGS. 4A, 4B, and 4C, operation of the data processor 26 will now be described. The CCD sensor array 16 converts the pictorial information into "pixel form", which is temporarily stored therein, and clocked out via a control signal generated under program control within the DSP 30 for conversion to digital form by the A/D converter circuit 24. A second control signal is used to initiate the A/D 24 digitization. The A/D 24 control signal is either generated under program control within the Digital Signal Processor (DSP) 30, or by digital logic which provides a sufficient delay from a pixel clock signal to allow the analog pixel data time to settle to the desired accuracy before initiation of the A/D 24 digitization. The digitized pixel data from A/D 24 is then either stored, under program control from within the DSP 30 to an internal RAM storage area of DSP 30, or external RAM 34 storage attached directly to the DSP 30 external address, data and control busses, for example. The digitized pixel information from the A/D converter circuit 24 so transferred into a random access memory (RAM) will be further processed by the digital signal processor 30.

Computer programs for operating the digital signal processor 32 are stored in a EPROM 36. The DSP 30 is programmed to extract the digitized image information from CCD 16, and process it for obtaining the "strip" of values extracted from the bins of pixels 42 and 44 of video ring 40. As a result of the processing by the digital signal processor 30, the angular image segments 42 and 44 are placed linearly and successively side by side for producing the strip information shown in FIG. 7. Each "bin" value is provided as an individual stripe 45 of respective successive stripes 45 of strip 46. In the next step, the digital signal processor 30 is programmed to pass the image information strip 46 to the computer interface circuit 38, for providing information strip 46 as a data output signal to a computer or central processing unit, for utilization for vehicle navigation or locating purposes.

The DSP 30 is programmed for averaging all of the pixels in each of the alternating and successive bins of pixels 42 and 44 of the image ring 40. The DSP 30 is also programmed for outputting only information associated with these more limited data points or "bins" instead of the 78,408 points that typically are provided from a video camera or CCD array 16 after a determined period of time in milliseconds.

Note that in another embodiment of the invention the DSP 30 includes the RAM 34 and EPROM 36 on a single integrated circuit chip. However, depending upon the application, additional RAM 34 and EPROM 36 may be required off chip.

Detailed operation of an embodiment of the invention for FIGS. 4A, 4B, and 4C will now be described. The DSP 30, acting as a high-speed controller, controls the operation and acquisition of image data from the CCD circuit 16. A processor clock 31 supplies the fundamental timing signal for operation of the DSP 30. The DSP 30 controls both the integration (exposure) time of the CCD 16 and the latter's internal frame storage, and also controls the readout of line and pixel data from the CCD 16 for each frame through a timing waveform generator circuit 33. The A/D circuit 24 samples and converts the analog pixel data to digital form. The A/D 24 timing is either controlled directly from the DSP 30, or by a small amount of additional logic such as timing waveform generation circuitry 33, so that it is properly synchronized with a pixel data readout clock pulse (not shown). The DSP 30 can directly control the operation of the CCD 16 since it is not required that the CCD 16 operate with a fixed (non-varying) timing for exposure time and internal image storage and readout. Since DSP 30 generates clock signals using program loops, the timing of these signals is not exactly uniform. This scheme eliminates the necessity of circuitry to synchronize and acquire digital data from an imaging subsystem which uses internal clocks. As a result, this allows the DSP 30 to dynamically control the transfer of pixels between CCD 16 and A/D 24, and A/D 24 and DSP 30. This scheme also eliminates the need for clock generation circuitry to control the CCD 16 and A/D 24, and the need for synchronization of the DSP 30 with the A/D 24. This increases efficiency in several ways:

DSP 30 resources do not need to be spent on synchronization or interrupt servicing.

The DSP 30 can spend a variable amount of time to process data from each pixel, since it can control the timing of the acquisition of each pixel. This means that blocks of image data can be compressed as they are acquired, instead of storing the entire image in RAM 34 first.

A lower-cost A/D converter 24 can be used to achieve a specified frame rate, since all of the pixel data on each line is not used, and does not need to be converted to digital form. In the preferred embodiment, unneeded pixels are discarded by clocking them out of the CCD 16 at a relatively high rate in comparison with the conversion time of the low-cost A/D 24; the A/D converter 24 is not as a result burdened with digitizing these sequences of unneeded pixels. Unneeded pixels at the end of each line are discarded by clearing the CCD 16 output buffer (not shown) when the last needed pixel from each line has been digitized.

Unused lines at the top and bottom of each frame can be discarded by clocking unused sequences of lines into the CCD's 16 output buffer, followed by a clear operation on the output buffer.

For a given CCD 16 and A/D 24, the frame rate can be increased beyond the limits that would be obtained using the previous description of the data acquisition procedure, if some loss in vertical resolution can be tolerated in a given application. In this operating mode, the DSP 30 will clock groups (sequences) of lines into the CCD 16 output buffer without clocking pixel data out of the output buffer. In this mode, the charge representing analog pixel data from each vertical column in a line group will be summed in the associated output buffer pixel charge storage element of the CCD 16. The DSP 30 can then acquire the CCD 16 output buffer pixel data which is in the form of a single line representing the vertical summation of a group of lines. The advantage of the use of the DSP 30 to achieve this mode of video data acquisition also allows further flexibility in the vertical segmentation of the frame into groups of lines for efficiency in subsequent processing. The number of lines in each group of lines need not be identical throughout a frame. This can be used to advantage in two ways:

The smearing of video or image data across strixels (a strixel is the average of all pixels in a bin i) can be held approximately constant by using a variable number of lines per group. In this case, relatively more lines are assigned to groups for which the strixels are primarily oriented in either a horizontal or vertical direction, and relatively fewer lines are assigned to groups in regions which contribute to pixels which are primarily at either 45°, 135°, 225°, or 315°.

For a given exposure time and a given A/D 24 resolution, it may be desirable to accumulate charge across sequences of lines in regions of the image with low light levels. The dynamic range of portions of an image with low light levels (that produce CCD pixel output voltages which are close to the optical black output voltage of the CCD 16) will be quantized relatively coarsely in comparison to regions of the image with higher light levels. In this case, a reduction in vertical resolution in low-light regions of the image may be more than compensated for by improved resolution of the light levels in these portions of the image with a resultant increase in utility of this data to the algorithm. This mode of operation will be more efficient when the change in the image from frame to frame is small enough for good prediction of the light levels in segments of the next frame to be made based on the image in the current and previous frames.

The exposure time for each frame can be controlled dynamically, on a frame-by-frame basis, in order to optimize performance of the overall system. For any data from any given frame, it is possible that some portions of the frame are either under or overexposed, based on the dynamic range specifications of the CCD 16 and the A/D 24, coupled with variances in external lighting and the reflectances of objects in the scene. Additional data for under and overexposed regions can be acquired using the DSP 30 to change the integration time appropriately for proper acquisition of image data from these regions. After re-exposure, efficient acquisition of portions of image data can be accomplished using the previously described techniques for discarding lines and pixels.

At frame rates for which images do not change rapidly from frame-to-frame, the optimized integration times for each portion of the image can be computed from the current and previous frames for the next frame. A sequence of exposures followed by acquisition of image segments can then be used to generate a composite image without first acquiring the entire image containing portions of unusable data.

This method of acquiring data from different segments of the CCD 16 using different exposure times for each segment allows the use of either a lower-cost A/D 24, lower-cost CCD 16, or an effective increase in dynamic range for a system consisting of a given CCD 16 and A/D 24.

This method of acquiring data from different segments of the CCD 16 may also be used to increase the efficiency of the algorithm in cases where portions of the next frame image are predicted to not be useful to the algorithm, either due to light levels which are out of range of the ability of the system to resolve, or due to these portions of the surroundings contributing no useful information regarding the scene immediately surrounding the vehicle.

In order to achieve lowest overall system cost, it may be necessary to use additional RAM 34 and EPROM/PROM 36 with the DSP 30. This is based on the resolution of the CCD 16, the amount of image data that needs to be processed, the cost of the associated integrated circuits, and the amount of RAM 34 and EPROM/PROM 36 that are provided on-chip for a given DSP 30. These IC's (integrated circuits) would all be attached directly to the DSP 30 external address/data bus. A separate communications IC is not necessary, since the DSP chip 30 can also function as a communications device, although it may be useful to relieve the DSP 30 of the overhead associated with communications functions.

A range for the resolution for CCD 16 of 19,200 pixels to 307,200 pixels is believed adequate, dependent upon the application. The range of exposure time suitable for this type of sensor is from ½ sec to $1/15,000$ sec., which is believed to be adequate depending on the application, and the previously described method for extending the dynamic range of the imaging system. Allowing a range of exposure times is analogous to being able to control the shutter speed of a camera—to control exposure based on lighting level.

In the above-described embodiment of the invention, the CCD array 16 is as previously indicated a commercially available integrated circuit CCD. As such, the CCD array 16 is substantially rectangular or square, and will detect all of the image information reflected to it from the reflective hemisphere 4, whether within or outside of the image ring 40, such as the image information encircled by the image ring 40, for example. As a result of this the digital signal processor 30 must be programmed for extracting only the video information representative by the image ring 40, in this example, as described above. To accomplish this, one embodiment of the invention provides an algorithm that defines an ellipse on the reflective image. This requires the establishment of a number of key parameters, namely a center point ($C_x$, $C_y$), an inner and outer radius r and R, respectively, and an aspect ratio, $\alpha$. These parameters in the below algorithm are required due to having non-square pixels in the CCD array 16 or the A/D 25 converter 24. Each pixel (x,y) in the image then has an elevation as shown below in equation (1):

$$e(x, y) = \sqrt{(C_x - x)^2 + \left(\frac{C_y - y}{\alpha}\right)^2} \quad (1)$$

and an angle $$a(x, y) = \operatorname{atan2}\left(\frac{C_y - y}{\alpha}, C_x - x\right) \quad (2)$$

Each pixel represented by the coordinates x and y belongs to a bin i iff r<e(x,y) <R and $360 x_B^{i} \leq a(x,y) < 360 X_B^{(i+1)}$, where B is the number of bins extracted. Next a strixel's value for bin i is calculated as the average of all pixels in bin i. Note that this computation is an approximation, and that the reflective hemisphere 4 is not perfectly spherical, sometimes requiring a calibration step for obtaining a strip 46 (see FIG. 7) representative of strixels evenly spaced about the CCD array 16. Note also that the various constants depend upon the exact CCD array 16, hemispherical reflector 4, lens 6, and A/D converter 24. However, the present inventors use radii that typically correspond to elevations between −30° and +30°, and typically use B=120 strixels.

In an engineering prototype for the present invention, the sensor based navigation extracts the strixels in software. The C-code program steps which perform the extraction are listed below, for example. The "strip_info" structure contains the pixel to strixel mapping information determined from a two-ellipse method. For each "bin, " the average intensity of the pixels in that bin is calculated as follows in C-coded steps:

```
A.   /* function for strip extraction */
B.   void getStrip(int size,unsigned char *data,StripPix
     *strip_info)
C.   {
D.      register unsigned i,j,sum;
E.
F.   /* this call fills the global variable image_data */
G.   /* with the digitized image */
H.      getImage(size);
I.
J.      for(i=0;i<strip_info->nbins;i++) {
K.         sum=0;
L.         for(j=0;j<strip_info->bin[i].npts;j++) {
M.            sum+= (image_data[(strip_info->bin[i].pt[j].x+
N.               strip_info->bin[i].pt[j].y*image_w)]);
O.         }
P.         data[i]=(strip_info->bin[i].npts?sum/
           strip_info->bin[i].npts;
Q.            i>0?data[i-1]:0);
```

The above software implementation in an actual commercial product of the system will likely be more hardware oriented. This is shown in the flowchart of FIG. 4C, for another embodiment of the invention.

Figure 8:
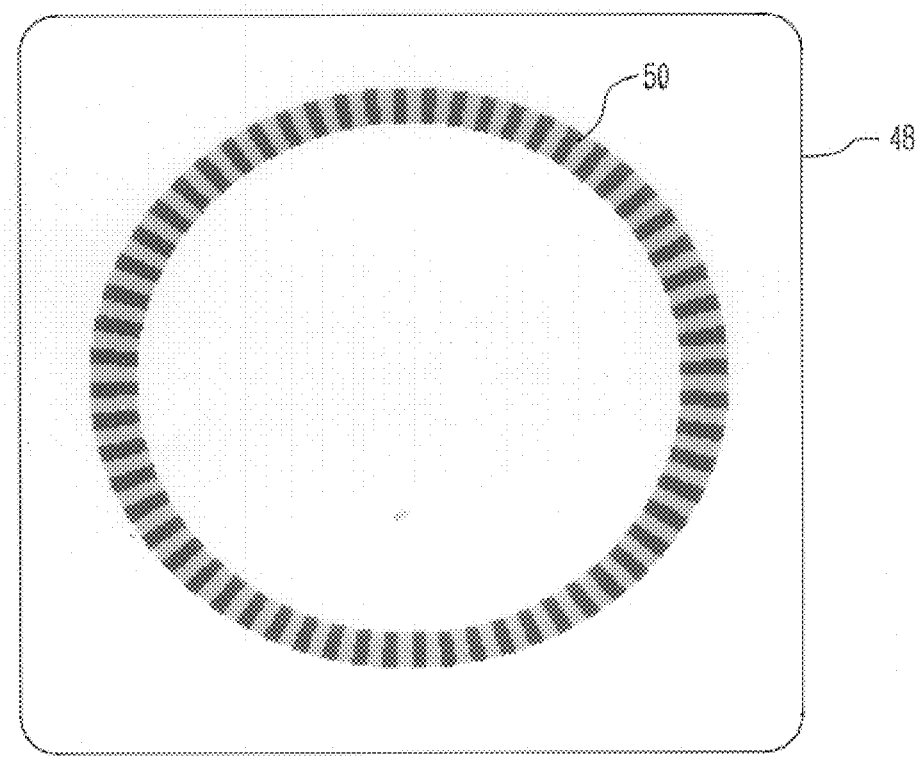
FIG. 8 is a simplified pictorial view of a customized CCD array for another embodiment of the invention.

In another embodiment of the invention, the present inventors recognize that the digital signal processor 30 can be simplified or eliminated by changing the above-illustrated CCD array 16 to have a customized configuration, for detecting image information only in a ring of sensors analogous to the image ring 40 of FIG. 6. Such a CCD array 48 is shown simplistically in FIG. 8 to have a ring 50 of successive bins 51 of CCD sensors corresponding to the alternating and successive bins of pixels 42 and 44 of image ring 40, respectively. Since a CCD array 48 as shown in FIG. 8 is not commercially available, such a device must be custom fabricated. However, the fabrication of such a CCD array 48 is well within the state-of-art of the present technology. For example, see "Electronic Engineer's Handbook", Third Edition, McGraw-Hill Book Company, pages 20–45 and 20–46. If such a CCD array 48 is employed, the DSP 30, for example, can be programmed to sequentially and successively transfer the images or pixels of bins 51 from CCD array 48, through A/D converter circuit 24, and into RAM 34 for temporary storage, or through computer interface 38 directly without first being stored. Regardless, the digitized image data from A/D converter circuit 24 is directly connected, or indirectly connected via EPROM 36, to the computer interface 38, for outputting the same to a CPU or computer, as previously indicated.

Figure 9:
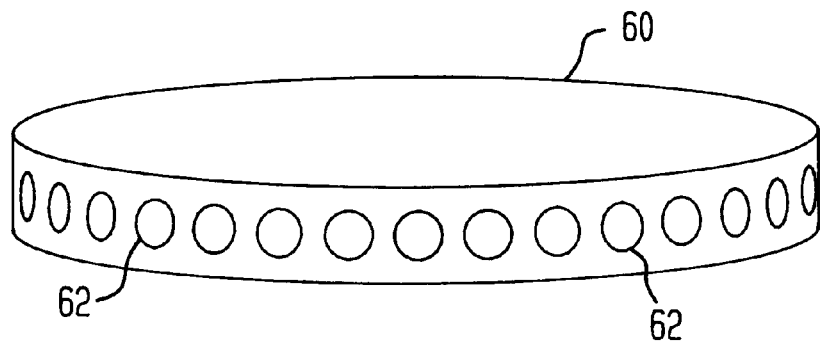
FIG. 9 is a pictorial view of an ommatidia disk light sensor for another embodiment of the invention.
Figure 10:
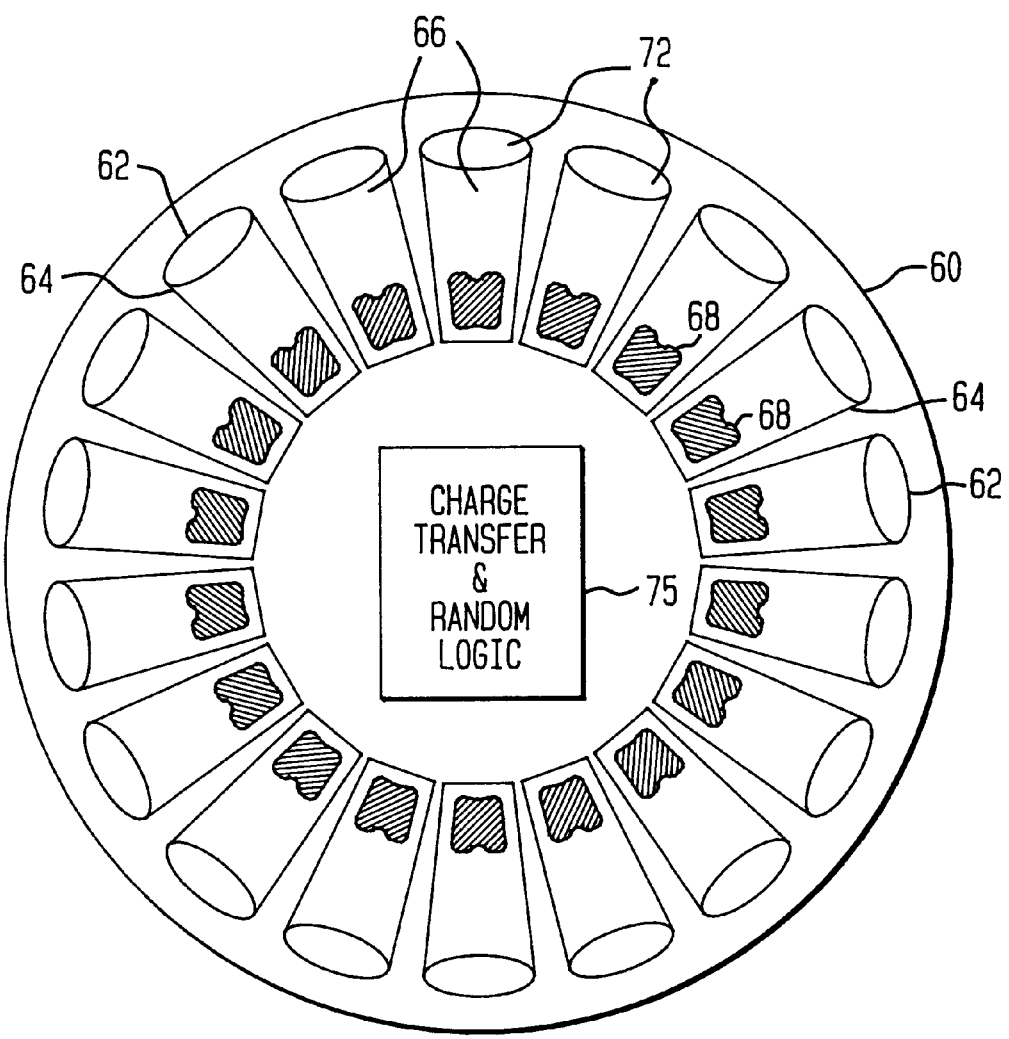
FIG. 10 is a top peel away or interior pictorial view of the ommatidia disk of FIG. 9.
Figure 11:
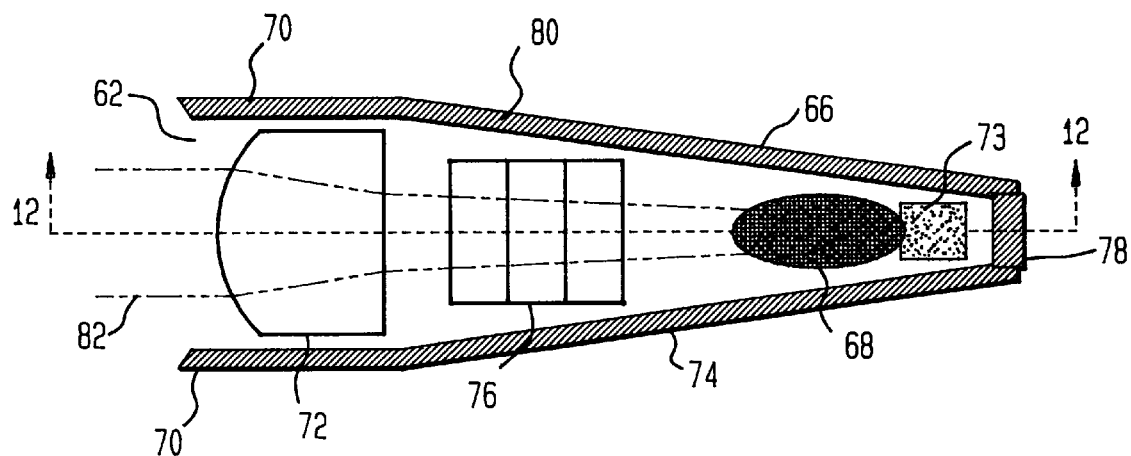
FIG. 11 is a top sectional view of one "capsule" of the ommatidia disk of FIG. 10.

In yet another embodiment of the invention, an ultra compact image detector, as shown in FIGS. 9 and 10, was conceived as an alternative to the image detectors of FIGS. 1 and 2. More specifically, the alternative image detector is in the form of an ommatidia disk or discoidal detector 60 that includes a plurality of successive windows or holes 62, in this example, around the circumferential edge or side of the disk 60. The holes 62 each extend radially inward to a centermost portion of the interior of the disk 60, and although shown as being circular in this example, can be otherwise shaped. Each hole 62 has inwardly converging sidewalls 64, as shown in FIG. 10, for forming a plurality of capsules 66. Each of the capsules 66 act as a waveguide for light entering an associated hole 62. For purposes of simplicity in the illustration in FIG. 10, the capsules 66 are shown as being wedge or cone shaped. However, as shown in FIG. 11 for a lateral cross section of a capsule 66, the frontmost wall portions 70 are parallel for providing a circular section for housing a lens 72. The circular section 70 of each capsule 66 is joined to a cone shaped rear-most portion of the associated capsule 66 formed by radially inward tapering converging wall portions 74. In one embodiment of the configuration for the ommatidia disk 60, a prism 76 is mounted within the frontmost portion of the cone shaped section 74 to bend the light onto the photosensor 68. A photosensor array 68 is provided by a plurality of any suitable known photosensing devices such as a photodiodes, charge couple devices (CCD), phototransistors, and so forth. Each photosensor or photosensor array 68 serves to detect a large pixel or a bin of pixels, respectively, representative of one portion of a panoramic strip of surrounding scenery. Charge transfer devices 73, and A/D converters and random logic 75 sample the output of the photosensor, perform initial processing, and hold the data for transfer to the next stage of the system. The walls 70, 74, including an innermost end wall 78, together provide optic light baffles 80 for the capsule 66, for preventing light rays 82 entering the capsule 66 through opening 62 from escaping from the capsule 66. In this manner, light rays 82 entering a given capsule 66 are prevented from crossing into adjacent capsules 66, thereby preventing image distortion and interference from light traveling between the capsules 66. By partially eliminating the baffles 80, it may be possible to increase the light-gathering efficiency of the system at the expense of spatial resolution.

The cross section of FIG. 11 is representative of a transverse cross section for an individual capsule 66 of the ommatidia disk 60 of FIGS. 9 and 10. Note that the shape of the sensitive area of the photosensor array 68 may be other than the shape illustrated in the drawings.

Figure 12:
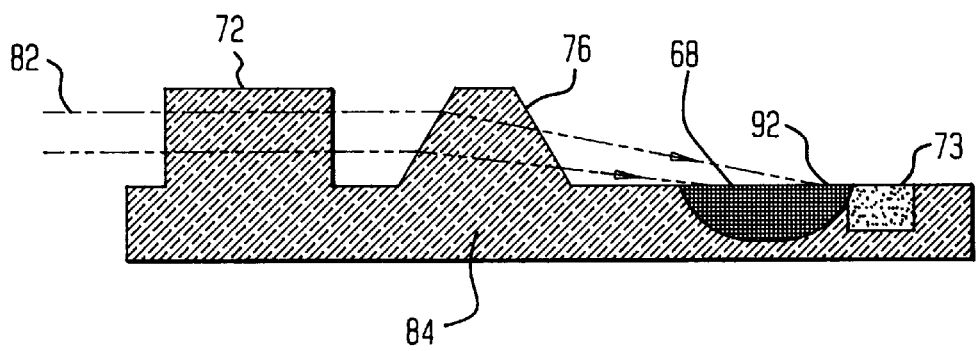
FIG. 12 is a cross sectional view taken along line 12—12 of FIG. 11.

A lateral cross section taken along line 12—12 of FIG. 11 is shown in FIG. 12, with wall portions 70, 74, and 78 not being shown for purposes of simplicity. As shown, in one embodiment the ommatidia disk 60 is fabricated on a substrate 84, such as a silicon substrate. Through use of known integrated circuit fabrication techniques, including etching, photomasking, epitaxial growth, and/or diffusion, for example, the lenses 72 prisms 76, and photosensor arrays 78 are formed on substrate 84. In this manner, the ommatidia disk 60 can be miniaturized. Otherwise, on a larger scale, the ommatidia disk 60 can be provided from discrete components.

Figure 13:
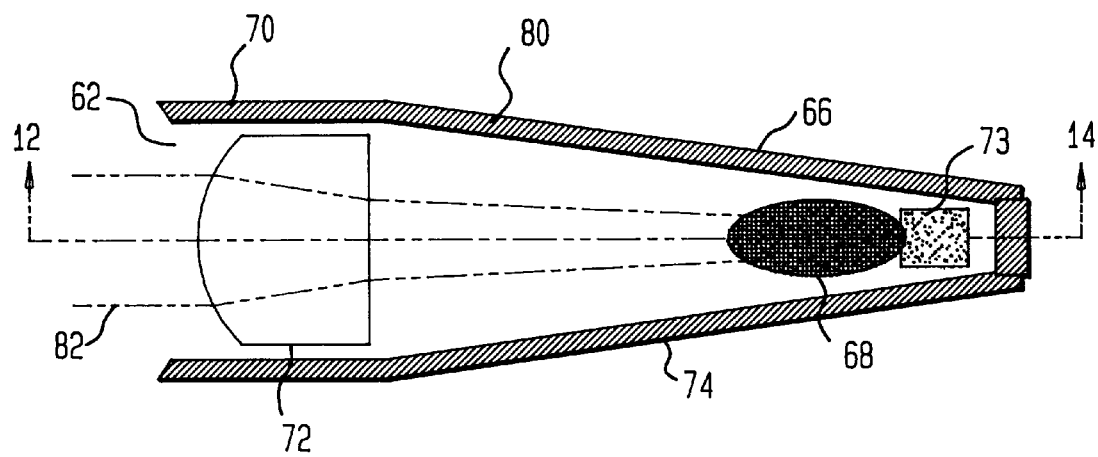
FIG. 13 is a top sectional view of an alternative embodiment for the capsules of the ommatidia disk of FIG. 10.
Figure 14:
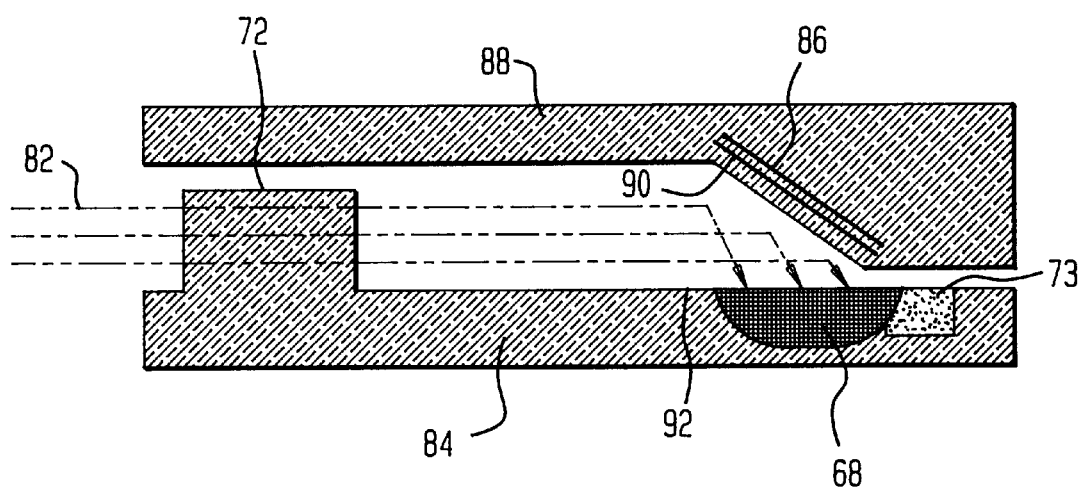
FIG. 14 is cross sectional view telecon along line 14—14 of FIG. 13.

In another embodiment of the invention, as shown in a transverse cross section of a capsule 66 in FIG. 13, and the cross section thereof taking along 14—14, as shown in FIG. 14, the prism 76 of the embodiment of FIGS. 11 and 12 is replaced by a reflecting mirror 86. The substrate 84 for the embodiments of FIGS. 11 and 12, and FIGS. 13 and 14, includes bottom portions of the capsules 66 formed therein.

A cover substrate 88, as shown in FIG. 14, includes top portions of capsules 66 formed therein, in this example. In the embodiment of FIG. 14, the cover substrate 88 is fabricated to also include the mirror 86 on a mirrored sloped portion 90 thereof. An appropriately shaped similar cover substrate 88, without the mirror 86, is used for providing the top portions of the capsules 66 of the embodiment of FIGS. 11 and 12, but is not shown for purposes of simplicity. The ommatidia disk 60 can be oriented in any plane as desired, for providing a 360° panoramic image of its surroundings, in this example. The number of capsules 66 employed in a given ommatidia disk 60 can be increased or decreased depending on the desired resolution. Also, if less than a 360° panoramic image is required in a given application, only a required section of an ommatidia disk 60 may be employed, such as an appropriate pie shaped section thereof.

In operation, for an ommatidia disk 60 incorporating the embodiment of FIGS. 11 and 12, light rays 82 enter through associated opening 62 of a capsule 66, travel through convex lens 72, which converges the light in the transverse plane in this example, and directs the light rays 82 upon prism 76. The prism 76 then directs the light rays 82 laterally downward, all for focusing the light rays 82 onto the light sensitive area 92 of the associated photosensor array 68. As is known, the photosensor array 68 converts the light rays 82 into an electrical signals, which are processed as previously described. In the embodiment of FIGS. 13 and 14, for each capsule 66, the light rays 82 focused by lens 72 are reflected by mirror 86 onto the light sensitive surface 92 of photosensor array 68.

In broad terms, the ommatidia disk 60 comprises a radial array of capsules 66 lying in a common plane, each of which includes means for focusing light rays 82 entering through an associated opening 62 thereof onto an associated photosensor array 68. The light rays so detected are representative of a portion or bin of pixels of an image surrounding the ommatidia disk 60. The image portion gathered by each one of the capsules 66 is dependent upon the associated field of view of each of the individual capsules 66. As a result, the composite of the images detected by successive capsules 66 provide a horizontal band or panoramic strip of the scenery about the disk 60.

Color Image Detection

In another embodiment a color CCD or color video camera means or color image detector 8 is used. Color is typically represented with three values. In most color cameras these values determine the amount of red, the amount of green and the amount of blue at each point, or pixel in the image. Such a system is called RGB for red/green/blue. The RGB values for each pixel provide three times as much information as the single value associated with intensity that is produced by gray-scale (also called black and white) cameras.

When regular strips 46 are detected, as previously described, the average intensity within each bin 42, 44, for example, of the annulus is recorded. However, when a color video camera or image detector means is used, the ability to record color information about each bin of pixels in addition to the average intensity level is obtained. In this case, for each bin an RGB value is detected and recorded, yielding a color strip 46 of successive color stripes 45.

These color stripes 45 may be more useful than the intensity-only ones. Color is a highly distinctive feature that may be used for distinguishing between strips 46. Two strips 46 may look the same in the intensity band and yet look very different when color is considered. This is because many different color values will be mapped to the same intensity value. Thus color provides the chance of greater distinctiveness between the individual stripes 45 when comparing two strips 46 for similarity, for example, thereby enhancing the accuracy of determining whether two strips 46 correspond to the same location.

This distinctiveness may be useful in recognizing locations in the world, giving greater accuracy in determining the position of a vehicle, in a vehicle locator system, for example, where color is not used, two distinct locations may have similar dark stripes 46 when only shades of gray are employed. However, when color is considered, it could be the case that the coloration of one strip 46 (e.g. the colors of its successive stripes 45 or bins 42, 44) is different than the coloration of the other strip 46 being compared thereto. When color is considered, the stripes 45 are seen as clearly distinct, and a vehicle locator or tracking system, for example, employing the present invention can easily determine which strip 46 more closely corresponds to the current position of an associated vehicle.

Another way in which the use of color may aid automatic vehicle location, for one application example, is in computing the degree of rotation via a visual incremental turn detector. Such a detector 55 operates by comparing the current strip 46 with all possible rotations of the previous strip 46 recorded along a road for an adjacent image or target, to see which one gives the best match. The best match is considered to give the most probably degrees of rotation, e.g., for a vehicle turning a corner. More sophisticated and efficient techniques might also be used to obtain sub-pixel resolution, as in standard egomotion calculation algorithms in computer vision.

The use of color may aid in determining the best rotation match. For example, a current strip 46 may have a fairly close match to more than the possible rotation of the previous strip 46. When color is considered, the possible matches between the strips 46 may become more distinctive, and the correct match becomes obvious.

There is more than one method to calculate the color values in the strips 46. One way is to determine the average color in each bin 42, 44. This is similar to the way intensity strips are computed. The red value for each bin is computed as the average of all the red components of the pixels in that bin. The green value is the average of all the green components of the pixels, and similarly for the blue.

A second method for calculating the color values in the strips 46, is to assign the brightest pixel in each bin as being representative of that bin. Each pixel in that bin is examined to determine which one is the brightest and the value of that pixel becomes the value associated with the bin. The brightness is computed as simply the average of the brightest red, green, and blue values of each pixel.

A third method for calculating the color values in the strips 46 is to determine which pixel in each bin is the "most colorful", and assign that value as representative of the bin. The "most colorful" pixel is determined as that pixel of the bin being the furthest from medium gray by Euclidean distance measure. Medium gray is considered to have the RGB value of (127, 127, 127). The color distance C may be expressed as follows:

$$C = \sqrt{(R-127)^2 + (G-127)^2 + (B-127)^2} \qquad (3)$$

where R, G, and B are the actual values for red, green, and blue.

A fourth method for calculating the color values in the strips 46 is to determine which pixel has the best combination of brightness and difference from gray. The pixel in each bin with the best score is assigned as the characteristic value of that bin. The score S is calculated as follows:

$$S = \sqrt{(R-A)^2 + (G-A)^2 + (B-A)^2} + \sqrt{R^2 + G^2 + B^2} \qquad (4)$$

where A is the average of the RGB values of the pixel computed as follows:

$$A = \frac{R+G+B}{3} \qquad (5)$$

A fifth method for calculating the color values in the strips 46 is to divide all possible colors into a small set of characteristic colors. Then for each bin a histogram is computed to determine how many pixels are close to each color in the set. The set color with the most pixels similar to it is considered representative of the bin. Regardless of which method is used to compute the color strips 46, the resulting color strips 46 are compared to each other by the standard distance metric to produce a degree of match. This match is used to determine position in the case of vehicle location applications, or to determine rotation in the case of the visual gyroscope applications.

After the strip 46 shown in FIG. 7 is extracted from the image, further preprocessing of the strip is required. This preprocessing involves normalizing the strip or strips 46 to insure that images subsequently taken at the same place, such as a particular position along a roadway, will produce strips substantially similar to the target strip information extracted earlier at the same position, regardless of noise, illumination changes, and other environmental changes. More specifically, the present image preprocessing 65 and 65' (see FIGS. 1B and 1C) is described below in conjunction with sparse and dense tracking embodiments of the invention.

sparse Tracking

In FIG. 1B, a simplified block diagram and flowchart is shown illustrating the main components of a sparse tracking embodiment for the present vehicle location system. Typically, the analog video or image sensor 61 is provided by a camera 52, such as a CCD (charge coupled device) optical detector or camera, which can be either mounted on top of a vehicle, or for more limited viewing within a vehicle, for continuously providing video images of a horizontal image plane at a given elevation about the vehicle. When mounted on top of the vehicle, a panoramic image of up to 360° can be obtained. However, if the analog visual image sensor 61 is mounted within a vehicle, substantially less than a 360° pictorial view might be obtained, as will be seen from a detailed description of the camera 52 given below. Each detected visual image may contain a grid of 360 by 240 pixels, for example. As will be shown in greater detail, in one embodiment of the present invention this information is compressed or reduced to the minimum necessary for reliably tracking a vehicle's location. Part of the reason for being able to so reduce the image information in various embodiments of the invention is due to the dead reckoning information obtained from the odometer wheel or device 54. The present inventors recognize that the dead-reckoning information so obtained is typically very accurate over short periods of time or movement of the vehicle, but tends to accumulate errors over time, whereby the visual portions incorporated in the systems are used to automatically correct for any such built-up errors, as will be explained below.

The image information obtained from the camera 52 is digitized via an image digitization device 63. The digitized information is inputted to an image preprocessing unit 65, which extracts a narrow strip of the image, as described in detail above, for use in landmark recognition locating the position of the vehicle in real time. Sobel edge information is extracted via the image preprocessing 65 from the image strip as an edge strip, and provided as input data into a landmark recognition unit 67. In order to overcome problems of illumination changes encountered in driving an associated vehicle in an outdoor environment, the edge strip information is enhanced and normalized to insure that the edge strips provided from the image preprocessing unit 65 to the landmark recognition unit 67 at different times will appear similar despite illumination changes over the course of time relative to the same target locations. In an engineering prototype, each edge strip contains 60 bytes of condensed or compressed digitized image information.

The landmark recognition unit 67 operates to determine whether the present portion of the edge strip matches the descriptions of any landmark or target information stored in a landmark database memory 69. In one embodiment of the invention, the landmark recognition unit 67 is provided by an artificial neural network simulator. Also, the landmark database 69 includes a set of network weights that are pretrained or predetermined before operating the system in real time to locate the associated vehicle. For example, the landmark database 69 may include the digitized information representative of target locations obtained during a previous drive of the vehicle over the roadway or course, on which it is desired to have the ability to track the location of the vehicle if it is driven over that roadway during subsequent times. In one embodiment, the present system maintains a probability estimate of a vehicle being at every possible street location within a designated region, with a resolution of one meter, for example. The location probabilities are modeled by using a combination of gaussian distributions, whereby each gaussian may have a different mean (i.e. expected location), amplitude and variance. Each time a landmark is recognized during subsequent travel of the vehicle over the associated roadway, the gaussian mixture is updated to incorporate new location information provided by the camera 52 as the vehicle continues down the road. Also, whenever a new or a changed odometer reading is provided by the odometer 54 to the location probability modeling unit 73, as the vehicle moves, the gaussian mixture is updated to correspond to the new mean of each gaussian.

The digitized data for a "skeleton map" is stored in a memory 71, for reading out to the location probability modeling unit 73. The skeleton map is a topological model of the streets, along with certain distance or metrical information associated with these streets. The topological model consists of street segments (i.e., graph edges), and intersections of street segments (i.e., graph nodes). The metric information typically includes the distance and direction of each street segment, and location of each intersection within a street segment. The locations of each landmark and each gaussian mean are represented by a street segment and a relative location on the street segment. The next step is to use the mixture of gaussian distributions for obtaining the most-likely vehicle location, which is the mean of the gaussian that has the highest peak, as shown by step or unit 77. Based upon the height of the most likely gaussian with respect to the other gaussians, the present system also provides a confidence score regarding the vehicle location information. The next step or unit 78, designated "display/speech", provides for displaying on the street map on the video monitor 53 the location of the vehicle, and/or providing real time oral directions by the audio system represented by speaker 57 to a driver. Step or block 79 represents the provision of these functions.

The extraction and processing of Sobel edge information is described in greater detail as follows:

A. Extracting Sobel Edges.

The Sobel edge operator is first applied to the strip to extract edges, in view of edge information being generally more resistant to illumination changes than light-intensity information. Note that the sobel edges are stored in 120 pixels.

B. Filtering Noise.

Well known thresholding techniques are applied to the Sobel edges for filtering out noise signals from dark image portions, which otherwise would be undesirably enhanced in the next step.

C. Locally Enhancing Sobel Edges.

A typical histogram modification technique is used to normalize Sobel edges, for reducing the effects of illumination changes. More specifically, the smallest 3% of the edge pixels are assigned 0 value, the largest 3% of the edge pixels are assigned a value of 255, and the remaining pixels are scaled linearly to have values ranging between 0 and 255. The histogram-modification technique is applied locally, in order to more effectively minimize the effects of non-uniform illumination. For example, to compute the new pixel values for pixels 8 through 22, the local histogram of pixels 1 through 30 are analyzed, rather than the histogram of all 120 pixels. Through use of the aforesaid technique, thin Sobel edges in dark portions of the image are enhanced while strong sobel edges occurring in over illuminated areas of the image are scaled down.

D. Reducing the Strip Size.

Further compression is contained in this last image pre-processing step by reducing the number of pixels in the edge strip to 60 pixels. This is accomplished by selecting the larger pixel out of every two successive pixels, or alternatively by taking the mean of every two pixels. However, the present inventors determined that it is preferred to use the former technique.

As shown above, through use of the image preprocessing 65, the original extracted image intensity strip is converted and compressed into an edge strip of 60 pixels, in this example. This edge strip includes all of the features which are used for landmark recognition.

Landmark selection, that is the establishment of the landmark database 69, is a critical aspect of another embodiment of the invention. In the present invention, a distinctive edge strip may be used to designate a landmark or object which has distinctive features, e.g. a wooded area along a roadway represented by the distinctive edge strip. It should be noted that landmarks are not required to be globally distinctive, in that two similar images acquired at different positions along a roadway can easily be distinguished through use of dead reckoning information, i.e., through use of odometer 54 readings if the two roadway positions are far apart.

In the present system a landmark is represented by a point or position on a street or roadway, for example. When travelling at a relatively high speed, a vehicle can move 24 meters per second, for example. In an engineering prototype of the present system, it was determined that when using slow hardware, the system was capable of processing approximately two images per second from a high speed vehicle. The gap or distance between two such consecutive images can be as distant as 12 meters, for example. Accordingly, for a landmark to be recognizable every time it is passed by a vehicle, the landmark's distinctive features must be observable within 12 meters of the neighborhood of a landmark. In recognition of this, the present system uses two criteria for automatic landmark selection. First, a landmark must be as distinctive as possible from other landmarks representing other locations along a roadway. A second criteria is that the points on a roadway immediately surrounding a landmark must be as similar to one another as possible. More specifically, for a preferred embodiment of the invention two heuristics are used to select places or locations along a roadway, as follows:

For each location considered, the average Euclidean distance is computed between the edge strips obtained within a 20 meter neighborhood of that location. The smaller the distance is, the more likely that the locations selected will serve as a landmark location.

For each location considered, compute the average Euclidean distance between the edge strips obtained within a 20 meter neighborhood, and the edge strips obtained outside a 40 meter neighborhood. The larger the distance is the more likely that the location will be selected as a landmark location.

During such landmark selection process, the landmarks are forced to be at least 40 meters apart. Note that it is possible that a long street segment or roadway, perhaps 200 meters long, does not have a landmark location on it, due to a lack of distinctive landmarks of various locations along the street.

With regard to the landmark recognition function or step 67 of FIG. 1B, in one embodiment of the invention artificial neural-networks are used to recognize landmarks. In this scheme, each landmark is assigned a unique neural network, which is specialized to recognize only that landmark. The input signal to the network is the 60-pixel edge strip obtained at some location X, with its single output being a score indicative of the similarity between the input location X and the landmark presently being considered. For example, the similarity score between a strip designated as lower case x, and a landmark designated as 1 is computed as follows:

$$\varnothing^l(x) = \sum_{i=1}^{60} a_i^l \cdot (x_i - c_i^l)^2 + b^l \tag{6}$$

where $a^1$ is designated for amplitude, $b^1$ is designated as bias, $c^1$ is designated as a center, with the aforesaid three parameters being the weights of the network for the landmark 1. In this example, $x_i$ has been normalized to be between 0 and 1. Equation (6) is used to compute the Euclidean distance between x and $c^1$, weighted differently in each input dimension by the vector $a^1$, plus a bias term $b^1$. similarity scores can be negative or positive. Preferably, it is desired that the network outputs a large positive number when the input place or location is exactly the landmark 1, and outputs a large negative number when the input place or location is a considerable distance from the landmark.

The network weights are automatically tuned by gradient descent techniques in a supervised learning manner. Suppose location p is chosen to be a landmark 1. In a present implementation of the invention, for each strip x obtained at location q, the network weights are adjusted to achieve the following objectives:

$$\phi^1(x) > 0 \text{ if dist}(p,q) \leq 10, \text{ and} \tag{7}$$

$$\phi^1(x) < 0 \text{ if } \text{dist}(p,q) \geq 18, \quad (8)$$

where dist(p,q) is the distance between p and q. Like other gradient descent techniques, the weight adjustment is small each time, and each strip is presented repeatedly until satisfactory performance is obtained. Given a strip, if the objectives have already been achieved, no adjustment is made. For q such that $10 < \text{dist}(p,q) < 18$, $\phi^1(x)$ is not forced to be greater or less than 0.

Because landmarks only need to be locally distinctive, when a landmark recognizer is trained, it is only trained on locations q which are within a radius of 5 kilometers from the landmark, instead of training it on all of the vailable strip data. This method also saves training time.

The greater the available training data, the better the recognizers that can be obtained. However, training data are often expensive to acquire. To train landmark recognizers with limited training data, the inventors conceived a technique for providing improved results. Simulated white noise is injected into the training data each time before they are presented to the training procedure. As some other neural-network researchers have found, this noise-injection technique often can help the networks generalize better.

Assume that someone went outside and collected strip data from some streets for the first time. Given the strip data, one first selects a set of places or locations to be used as landmarks, as previously mentioned. Next a neural network is created for each landmark, and trained using the strip data, as mentioned above. Suppose now one wants to go outside a second time and collect more data, perhaps because the first time it was in summer, and now it is desired to obtain training data with the world covered by snow.

To re-train the existing landmark recognizers with a new set of strip data from the same streets, one needs to know the vehicle location (relative to the landmarks chosen before) when an image was last acquired. This is because the present training procedure needs to know dist(p,q) (see equations 7 and 8 above), the distance between a landmark and an input location or place. By the tracking technique to be described below, one may compute dist(p,q) with a certain accuracy. If the second data set is not too different from the first one, it is believed that a large portion of the landmarks can be correctly recognized, and adequate location accuracy can be attained.

Every time an image is taken and a strip is extracted, it is input to each active landmark recognizer of landmark recognition 67 to produce a similarity score. There are many ways to decide which landmarks should be active. For example, for each hypothesized vehicle location (see below), a circle is drawn around it, and every landmark inside this circle becomes active, with landmarks outside the circle inactive. The radius of this circle may be determined by the system's confidence on its own location estimates; a larger circle can be used when the confidence is lower, as shown below.

Each active landmark recognizer and each strip produce a similarity score. For convenience, assume that inactive recognizers always produce a large negative score. As the vehicle is moving and images are taken, the tracking system monitors the similarity scores continuously coming out of the landmark recognizers. Once a similarity score is higher than some threshold (currently set to −2.0), the tracking system starts to pay more attention to the recognizer that produced the score. A typical scenario is that the similarity score coming from that recognizer varies in upward and downward directions for a time, and finally becomes smaller than the threshold again. After the similarity score remains smaller than the threshold for a given period of time (currently measured by the time for the vehicle to move 15 meters at run time), the tracking system analyzes the similarity scores to see if the landmark can be deemed to be recognized, and the landmark location determined therefrom. The analysis is in fact performed incrementally as each similarity score becomes available, but for ease of comprehension, assume the analysis is performed in a batch fashion, as presented below.

Landmark recognition is never perfect. A landmark may not be recognized, and a location may be misrecognized. In the present tracking system, landmark recognition is probabilistic. In other words, each recognized landmark is assigned a probability indicating how likely the recognition is in fact correct. The estimated landmark location is also probabilistic. The landmark location is modeled by a gaussian distribution in a location probability modeling step 73. The expected landmark location is expressed by an odometer reading, m; that is, the landmark is located wherever the associated vehicle has an odometer reading of m along the route.

When the similarity scores are analyzed, three numbers must be determined, as follows:

The gaussian amplitude (i.e., the probability of the landmark recognition being correct), the gaussian mean (i.e., the expected landmark location), and the standard deviation of the gaussian distribution.

Each similarity score higher than the predefined threshold (−2.0) indicates a possible landmark location. Note that each strip is associated with an odometer reading. A linear mapping has been defined from similarity scores to weights between 0 and 1. In the similarity-score analysis, the following steps are used:

A. First sum up all of the weights during the above-threshold period. If the total weight does not exceed some empirically determined threshold, then no landmark is claimed recognized. Otherwise, a recognized landmark is claimed.

B. When a recognized landmark is claimed, the gaussian amplitude is simply the maximum weight during the above threshold period.

C. The expected landmark location is the mean of all possible landmark locations weighted differently according to their weights (which are derived from the similarity scores).

D. The gaussian deviation is basically proportional to the distance the vehicle has travelled during the above-threshold period. Also, the deviation is forced to be no less than 10 meters.

The present tracking system can maintain multiple vehicle-location hypotheses in real time. Location hypotheses are updated when new information from odometer or video sensors becomes available. The immediately following paragraphs describe how it is done.

The vehicle location is modeled by a mixture of gaussian distributions plus a background probability distribution. Each gaussian indicates a likely vehicle location, with a probability and a standard deviation. Most of the time, the true vehicle location will be covered by one of the gaussians. The background probability distribution adds a constant (but time-variant) probability to every location in the neighborhoods of the gaussian means. The background probability is intended to cover the occasional situations when the tracking system gets lost due to odometer errors or unexpected errors, but the true vehicle location is still in the vicinity (for example, a radius of 2 kilometers) of one of the gaussians.

Only a limited area is assigned a non-zero background probability—it does not make sense to assign a non-zero background probability to every location in the world, because otherwise each location is assigned a background probability which would be too tiny to be useful. Currently the total size of the "background" is set to 4 kilometers. Note that it is not required to know exactly where the background is; it is somewhere around the gaussian means.

When the tracking system is turned on at the start of a journey within a premapped region, a gaussian mixture and a background probability are created as an initial guess of the vehicle location. Whenever a new odometer reading is received, the probability model must be updated to reflect that the vehicle has moved to a new location. Whenever a landmark is recognized, the probability model also needs to be updated to reflect the arrival of new location information. In order to perform these updates, the tracking system uses a skeleton map of the environment.

A skeleton map 71 is a directed graph model of the streets together with certain metric information. It consists of nodes (usually corresponding to intersections) and edges. Each edge is tagged with distance and very coarse direction information. The skeleton map is also tagged with landmark information. With such a skeleton map, the system can plan the shortest path between any two places, project a new vehicle location after a movement, and find all of the landmarks inside a circle centered at some place.

Every place in the environment is represented by two numbers, a street segment number and an index to that segment. The index is defined by the distance (in meters) from the location to the start of that street segment.

When a new odometer 54 reading is received, the gaussian distributions are updated to reflect a new vehicle location. The update is quite straightforward. The gaussian means are shifted by the amount of vehicle movement since the last reading. Also, the gaussian deviations are increased according to an error model of the odometer. When the vehicle is near an intersection, there are several possible places where the vehicle may go after a movement. To model this situation, a gaussian is split into several new ones when the skeleton map indicates that this gaussian passes a graph node after a vehicle movement. The new gaussians may share the same probability and deviation, but if there is any reason to believe one gaussian has a higher probability than the others, the system accommodates this. For example, if a compass or gyroscope is available, it may suggest that the vehicle has just made a left turn. In this case, the gaussian representing the left-turn case can be assigned a higher probability than the other gaussians representing the right-turn and no-turn cases. A visual gyroscope 55, which detects turns by analyzing a stream of strips, is described below for another embodiment of the invention.

As previously discussed, and with reference to FIG. 1B, when a landmark is recognized (step 70) (correctly or not), a triple ("probability", "mean", "deviation") is generated in step 67. To use this piece of location information, the tracking system creates a new mixture of gaussians and a new background probability for modeling the vehicle location, which is accomplished as follows. A new gaussian G is created with its mean being at the location of the recognized landmark, its amplitude being "probability", and its deviation being "deviation". The total background probability is set to (1-"probability"), and the size of the background is currently set to 4 kilometers. Recall that "mean" indicates the odometer reading at which a landmark was recognized. Let "odom" be the current odometer reading. When a landmark is claimed recognized, the vehicle has passed the landmark by ("odom"—"mean") meters, which may be as large as 30 meters (or more) in the prototype system. To obtain the current vehicle location from a landmark which is passed by a distance of ("odom"—"mean") meters, the landmark location is shifted down the streets by ("odom"—"mean") meters. Therefore, the gaussian G mentioned above is shifted to obtain a probability distribution for the current vehicle location. The shifting here is exactly the same as the dead reckoning process described above. In other words, the gaussian G may be split into several new ones, and the deviation(s) will be increased according to an error model.

Once a landmark is recognized, two probability models are obtained, each independently modeling the current vehicle location. One is from the previous iteration, and the other derived from the newly recognized landmark as discussed in the previous paragraph. Define the former as the old model, and the latter as the new model. The issue now is how to combine the two models into one.

In other words, the task is to obtain the location probability distribution at time t based on all of the sensory information before and at time t as follows:

$$p(x|I_0 \& r_1 \& \ldots \& r_t) \quad (9)$$

where x is a location, and $r_i$ is the sensory reading obtained at time i. To simplify the notation, let $h_t$ denote ($r_0$ & $r_1$ & ... & $r_{t-1}$). With this notation, the old probability model is $$p(x|h_t) \quad (10)$$

and the new model is $$p(x|r_t) \quad (11)$$

By probability theories, one obtains:

$$p(x|h_t \& r_t) = \frac{p(x \& h_t \& r_t)}{p(h_t \& r_t)} = \frac{p(h_t \& r_t|x)p(x)}{p(h_t \& r_t)} \quad (12)$$

Make a first assumption: $p(h_t|x)$ and $p(r_t|x)$ are independent. The assumption says that given that the current vehicle location is x, the probability of seeing $r_t$ now is independent of seeing $h_t$ before. By this assumption and Bayes' rule, one obtains:

$$p(x|h_t \& r_t) = \frac{p(x|h_t)p(x|r_t)p(h_t)p(r_t)}{p(x)p(h_t \& r_t)} \quad (13)$$

The quantity of $p(h_t)$, $p(r_t)$, and/or $p(h_t \& r_t)$ is unknown, but it is known that they are some constant. Since $p(x)$ is unknown, a second assumption is made: $p(x)$ is a constant. This second assumption cannot be correct, since some places are visited much often than other places. But since it is expensive to obtain a priori knowledge about $p(x)$, it is prudent to accept this assumption in order to simplify the problem.

From Equation (13) and the assumption associated therewith, $p(x|h_t \& r_t)$ is a constant times $p(x|h_t)$ (the old model) times $p(x|r_1)$ (the new model). Thus, to get a new vehicle-location probability distribution, the old probability model is multiplied with the new one, and then normalized such that the sum of probabilities equals 1. The new probability distribution then becomes the probability model for the next iteration. The multiplication is accomplished as shown immediately below.

Let $\rho(x)$ denote a gaussian distribution. The old probability model can be written as:

$$M_{old}(x) = \sum_{i=1}^{N} a_i \rho_i(x) + c(x), \quad (14)$$

where N is the number of gaussians, $a_i$ is the amplitude of each gaussian, and c is the background probability. Let z be the size of the background. Then $$\sum_{i=1}^{N} a_i + cz = 1 \quad (15)$$

Similarly, the new probability model can be written as:

$$M_{new}(x) = \sum_{j=1}^{M} b_j \rho_j(x) + d(x), \quad (16)$$

where M is the number of gaussians, $b_j$ is the amplitude of each gaussian, and d is the background probability.

The new vehicle-location probability distribution is thus:

$$M(x) = norm(M_{old}(x) \cdot M_{new}(x)) \quad (17)$$

$$= norm\left(\sum_i \sum_j a_i b_j \rho_i(x) \rho_j(x) + \sum_i a_i d(x) \rho_i(x) + \sum_j b_j c(x) \rho_j(x) + c(x) d(x)\right)$$

where norm() is the probability normalization operator. Note that c(x) and d(x) are a step function; that is, they have a constant positive value for a "background" area, and zero for the rest. Thus $c(x)\rho_i(x)$ is basically just $\rho_i(x)$ scaled by a constant, if it is assumed that c(x) is non-zero except for the tiny, infinite gaussian tails. c(x)d(x) is just another step function, and can be easily computed if one assumes their non-zero backgrounds coincide.

Equation (17) involves multiplying two gaussian distributions. Fortunately, one gaussian multiplying with another gaussian is also a gaussian. A problem, however, is that the number of gaussians grows by many times after multiplying two mixtures of gaussians. One must control the number of new gaussians created, otherwise they will expand exponentially fast. This is accomplished in two steps. First, nearby gaussians are combined into one. Next, the small gaussians whose peak probabilities are not greater than a few times of the background probability are eliminated. When a gaussian is pruned, its probability is merged into the background probability.

The combination of two nearby gaussians into one will now be described. Let $\alpha_3 \rho(\chi, \mu_3, \sigma_3)$ approximate $\alpha_1 \rho(\chi, \mu_1, \sigma_1) + \alpha_2 \rho(\chi, \mu_2, \sigma_2)$. Clearly, the new gaussian's amplitude should equal the combined amplitudes:

$$\alpha_3 = \alpha_1 + \alpha_2. \quad (18)$$

The new mean is obtained as follows:

$$\mu_3 = \frac{1}{\alpha_1 + \alpha_2} \int_{-\infty}^{\infty} (\alpha_1 \rho(\chi, \mu_1, \sigma_1) + \alpha_2 \rho(\chi, \mu_2, \sigma_2)) \chi d\chi \quad (19)$$

-continued $$= \frac{1}{\alpha_1 + \alpha_2} \left[ \alpha_1 \int_{-\infty}^{\infty} \rho(\chi, \mu_1, \sigma_1) \chi d\chi + \alpha_2 \int_{-\infty}^{\infty} \rho(\chi, \mu_2, \sigma_2) \chi d\chi \right]$$

$$= \left(\frac{\alpha_1}{\alpha_1 + \alpha_2}\right) \mu_1 + \left(\frac{\alpha_2}{\alpha_1 + \alpha_2}\right) \mu_2.$$

The new variance is obtained as follows:

$$\sigma_3^2 = \frac{1}{\alpha_1 + \alpha_2} \int_{-\infty}^{\infty} (\alpha_1 \rho(\chi, \mu_1, \sigma_1) + \alpha_2 \rho(\chi, \mu_2, \sigma_2))(\chi - \mu_3)^2 d\chi \quad (20)$$

$$= \frac{1}{\alpha_1 + \alpha_2} \left[ \alpha_1 \int_{-\infty}^{\infty} \rho(\chi, \mu_1, \sigma_1)((\chi - \mu_1) + (\mu_1 - \mu_3))^2 d\chi + \alpha_2 \int_{-\infty}^{\infty} \rho(\chi, \mu_2, \sigma_2)((\chi - \mu_2) + (\mu_2 - \mu_3))^2 d\chi \right] \quad (21)$$

$$= \frac{1}{\alpha_1 + \alpha_2} [\alpha_1(\sigma_1^2 + (\mu_1 - \mu_3)^2) + \alpha_2(\sigma_2^2 + (\mu_2 - \mu_3)^2)].$$

Let d be the distance between two gaussian means, $\mu_1$ and $\mu_2$. In the prototype system, two gaussians are considered close enough to be combined if $d \leq 30$ meters, or if $d \leq 2.2 \sigma_1$ and $d \leq 2.2 \sigma_2$.

For a user of the present tracking system, it is important to know when the system is reliable, and when it becomes unreliable. The present tracking system does provide some score to express its confidence on its location estimates. Currently the score ranges from 1 to 4. The score is computed according to three factors: the total background probability (the lower, the better), the peak probability of the highest gaussian versus that of the second highest gaussian (the larger, the better), and the standard deviation of the highest gaussian (the smaller, the better). This score is also used to determine the active landmarks. When the confidence is low, meaning that the system may be lost, more active landmarks can be utilized.

Dense Tracking

A flowchart for dense tracking is shown in FIG. 1C. To process image data using dense tracking in real time and effectively store a large number of images, a very reduced image format is used. Each image is a 1-dimensional reading taken (conceptually) from the horizontal viewing plane of camera 52. These strips 46 contain light intensity data from all 360 viewing angles around the camera 52, which is placed on top of the associated vehicle. The implementation details of the camera 52 apparatus are described elsewhere.

Figure 15:
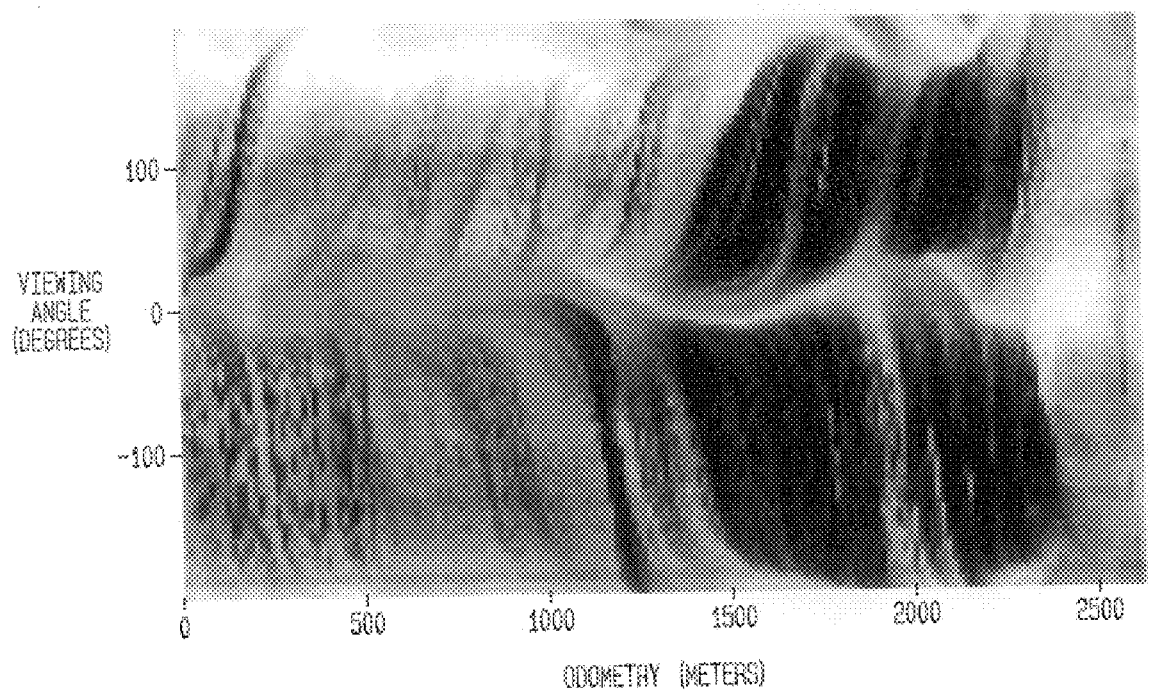
FIG. 15 is a pictorial view of a sequence of successive strips of image information actually obtained while driving a vehicle incorporating the present invention along a public roadway, representing a plot showing viewing angle in degrees relative to the front of the vehicle versus the "odometry" or distance travelled by the vehicle from some reference or starting designation.

As previously mentioned, the present system uses the strip 46 by matching it against a stored database of strips 46 obtained from previous runs from the section of road on which the vehicle is to be tracked. This stored database forms a sensory map 69' as shown in FIG. 1C (i.e. a map not in terms of the objects in the world, but in terms of what is perceived). While a single strip 46 does not seem to contain much information, this set of strips 46 that comprises a sensory map 69' is considerably richer. In FIG. 15, a sequence is shown of unprocessed image strips observed as a vehicle moves forward along a stretch of roadway. The unprocessed strips are used to form the strips 46, as previously described.

The image data shown is a portion of the sensory map 69' of the environment. This data holds an approximate description of what one expects to "see" during subsequent journeys along the same road. These strips 46 form the database used in a tracking algorithm to determine a vehicle's position. The algorithm is described below. A full database 69' includes strips 46 for all the roads the vehicle may navigate. Strips 46 are tagged with approximate relative distance (obtained from odometer 54 readings in the collection phase) as well as real-world positions. The connections between roads are represented with a skeleton map 71, which is a graph-like structure that lists intersections and the distances between them (as would be obtainable from a standard mapping system, such as the U.S. Census Bureau's TIGER/Line system).

It has been demonstrated that these compressed data strips for dense tracking relative to sparse tracking where more data is used per strip 46, contain enough data to be useful for navigation. In other words, 120 bytes of image data per meter of road for dense tracking, provides adequate tracking.

The position of the vehicle is determined by a continuously looping tracking algorithm. On each iteration the system receives as input:

An estimate of the previous position as calculated in the previous iteration.

The approximate distance travelled since the previous iteration, as measured from the vehicle's odometer 54.

A new image (or more generally, sensor reading) obtained from the visual image sensor 64.

The system also has access to the skeleton map 71 that describes the topology of the roadway (distances between intersections and intersection angles), along with the sensory map database 69' of stored images. These inputs are combined to produce a new estimate of position, which will then become an input to the next iteration. The control flow of this algorithm is depicted in FIG. 1C.

The possible locations for the vehicle are determined by the sensory map 69'. This is a discrete and finite (though potentially very large) set. To model uncertainty in the estimate, the system's internal representation of position is probabilistic. The system maintains a set of probability values to denote the likelihood with which the vehicle may be at various different positions. This set of probabilities is stored in memory as an exhaustive list (rather than in some more compact, but less general, representation such as a mean and variance for an assumed Gaussian distribution). This generality works well for situations such as where there is a fork in the road, and disjoint clouds of probability split off on each path). Since the processing time grows with the number of positions against which the current image must be matched, it is important that the set of positions under consideration not grow too large.

Of key importance in preventing the system from considering too large a set of possible positions is the high accuracy of odometer 54 readings. Estimating position by odometry alone can give errors of less than 1% of the total distance travelled (as long as there are not branch points in the road that odometry cannot disambiguate). The key need for sensory input (given that steering information could be obtained for the branch points) is to overcome the slow accumulation of error in the odometer 54.

Each iteration begins with motion modeling to calculate a predicted position (as a probability distribution) based on dead-reckoning. This procedure is as follows:

Initialize the probability distribution for the new position to be everywhere 0 (i.e. $p_i=0$ for all i).

For each position j assigned probability $p_j>0$ by the previous position (to speak up processing only check j's in the region of the database that had some probability on the previous iteration).

For each position i whose distance $\chi$ from j is no more than d+10 meters and no less than d -10 meters:

Compute the probability $p_\chi$ that the vehicle has moved forward $\chi$ meters given that the odometer 54 reports d:

$$P_x = e^{-.5\left(\frac{\chi-d}{\max(1,.2d)}\right)^2} / \left(\max(1,.2d)\sqrt{2\pi}\right) \quad (22)$$

[i.e. the probability of x according to a normal distribution of mean d and standard deviation max (1,.2d)].

Let $\alpha$ be the relative change in heading between images i and j in degrees (as obtained by the skeleton map 71 at intersections, or as obtained from the sensory map images for gradual turns along a road). Compute the probability $p_\alpha$ that the vehicle has turned a degrees given visual gyro 55 turn sensor reports $\theta$:

$$P_\alpha = e^{-.5\left(\frac{\alpha-\theta mod 360}{10}\right)^2} / \left(10\sqrt{2\pi}\right) \quad (23)$$

i.e. the probability of $\alpha$-$\theta$ according to a normal distribution of mean 0 and standard deviation 10 degrees).

Add the product $p_j p_\chi p_\alpha$ to $p_i$.

Renormalize the probability distribution (i.e. scale non-zero probabilities so they add up to 1).

The process is essentially to shift the previous position estimate the appropriate distance forward down the road. While the position is an arbitrary probability distribution, the change in position is modeled by a distance travelled that is Gaussian (aka normally distributed). The mean of this Gaussian is the increase in the odometer 54 reading since the last iteration. As a standard deviation, 20% of distance travelled or one meter is presently used, whichever is greater. The Gaussian is clipped at a 10 m radius from the mean, which is considered the maximum possible error in the reported change in the odometer 54 reading. A new position estimate is initialized by taking each position in the previous estimate that had non-zero probability and shifting that probability weight forward by the appropriate amount.

Vehicle heading information is used to help calculate the estimated next position. While such information could be obtained from gyroscope or differential odometer sensors, this extra hardware expense is avoided by using a visual gyroscope 55 based on the strip 46, as described herein. This provides an incremental turn for the current image relative to the previous image. This turn is used to modify the position in a fashion analogous to the odometer 54 as described in the immediately above procedure.

In one mode of operation, the visual gyroscope 55 is used to detect sharp turns explicitly. In that case, when the vehicle is in the process of turning, matching operations are suspended until the turn is complete. The visual gyroscope 55 includes processing that detects that a vehicle is currently in a turn. While this is the case, turn information and odometer 54 readings are accumulated (added together) and the strips 46 are not processed. Once the turn is ruled to be complete, the accumulated turn and distance readings are passed to the motion modelling 75. The current strip 46 is used by the matching procedure.

To perform this processing efficiently the system must be able to quickly determine the distance between two database entries. This is accomplished by saving the database positions sequentially along strips of roadways and by tagging different entries at intersections where the vehicle may switch roads. Similarly, database entries are labeled with heading angles and road intersections in the skeleton map 71 are labeled with the turning angles.

The processing in the immediately above procedure gives an initial estimate of the vehicle's position prior to incorporating sensory evidence. To incorporate these sensor readings Bayes' law is used as follows:

$$Pr(\text{Vehicle is at position } j|\text{Sensor Reading}) = \quad (24)$$

$$\frac{Pr(\text{Sensor Reading}|\text{Vehicle is at position } j)}{Pr(\text{Sensor Reading})} Pr(\text{Vehicle is at position } j)$$

That is, to determine the posterior probability of a position given the sensor readings (new image strips 46) received, the prior probability for the position (based on the previous step and odometry) is multiplied by a probability that the observed sensor readings or image strips 46 are generated from this position (the denominator is an overall probability of the sensor or image readings that is just for normalization).

The key step is to match the image input strip 46 against the stored database image strip 46 corresponding to a position to produce a probability value for the position given the sensor or image strip 46 reading. This requires a matching procedure 73 (see FIG. 1C). The required procedure 73 first takes an error score between these two images or image strips 46 based on the sum-of-absolute-value-of-differences (aka SAVD, *aka $L_1$ norm, aka Manhattan distance). This error score is converted to a probability by assigning each numerical error score the probability of that number according to a zero-mean Gaussian distribution. The matching procedure to obtain an updated vehicle position from a previous estimate is as follows:

Let s' be the current (preprocessed) strip of n values (the preprocessing is described below).

Set $v_0$ and $v_1$ to the minimum and maximum values in s'.

For each position i that has probability $p_i > 0$ according to the new estimated probability distribution on positions Let t be the strip saved for position i. Preprocess t to obtain a strip t' as was done for s above.

Compute the $L_1$ distance d between s' and t'

$$d = \sum_{j=1}^{n} |s'_j - t'_j| \quad (25)$$

Multiply the probability $p_i$ by the match probability $$\frac{e^{-.5\left(\frac{d}{n(v_1-v_0)/50}\right)^2}}{n(v_1-v_0)/50\sqrt{2\pi}} \quad (26)$$

(i.e. the probability of d according to a normal distribution of mean 0 and standard deviation $n(v_1-v_0)/50$).

Determine the maximum probability p for all the positions. For each position i where $p_i < 10^{-6}p$, set $p_i$ to 0.

Renormalize the probability distribution (i.e. scale non-zero probabilities so they add up to 1).

In addition, image preprocessing is performed before taking the $L_1$ norm. First a simple differencing operator is applied to the strip 46, so that for each strip position one takes not the observed intensity value but rather the difference in this value relative to its left (clockwise) neighbor. Secondly, the strips are normalized so that the sum of the absolute values of the (now differenced) pixels is a fixed constant. These operators serve to increase robustness to changes in basic lighting and weather conditions. In summary, the image preprocessing step is as follows:

Let s be the current strip of n intensity values recorded by the sensor

Preprocess s to form a modified strip s' as follows:
For j=1 to n, set $s'_j$ to $s_j - s_{j-1 \bmod n}$.
Rescale s' so that (j-1) mod n $$\sum_{j=1}^{N} |s'_j| = 128n$$

After computing the new probability distribution, extremely low values are rounded down to zero to prevent the set of possible positions (and hence the processing time) from growing too large. This is currently implemented by taking the maximum probability value for any one position, and setting to zero any values less than $10^{-6}$ times this maximum value. Finally, the values are normalized to sum to 1, and the next iteration with a new strip is processed in the same manner.

The processing rate is about two images per second in a prototype system. This can be increased with more suitable image processing hardware to replace a generic camera and video board in the present engineering prototype.

The present system for automatic vehicle location is completely autonomous. There is no need for costly or difficult manipulation of the environment (e.g. to install beacons or maintain satellites). A highly accurate position estimate is obtainable. From preliminary tests using an engineering prototype, vehicle position determinations are typically accurate to within about ten meters while driving the associated vehicle forward down a road. The system is similarly accurate in dense urban areas where buildings interfere with radio and other communications, such as GPS.

Also, the system has been proven successful at deciding which option a vehicle has taken at intersections (turning right or left, or going straight), and tracking through u-turns.

The system is robust against passing traffic and changing weather conditions. The prototype system has successfully operated from three different vehicles using a variety of different cameras and lenses. For long term reliability, the system will have to have its database 69 or sensory map 69' updated to follow environmental changes in the world, such as new buildings, landscaping, loss of trees, loss of buildings, and so forth.

Meta-Switch for Switching between Sparse and Dense Tracking

In the dense tracker mode of operation, locations where an unmapped road (i.e. a road or driveway for which there is no sensory map 69') branches off from the mapped roadways is annotated in the skeleton map 71, along with the angle at which the road diverges. Note that the database 69 for sparse tracking is different from the database for sensory map 69' for dense tracking. If motion modelling puts the position on such a diverging branch with at least 90% probability, the vehicle is declared "off map". This has the effect of believing the visual gyroscope 55 when it indicates a turn off the road, provided the possibility of such a turn has been noted in advance.

Figure 17:
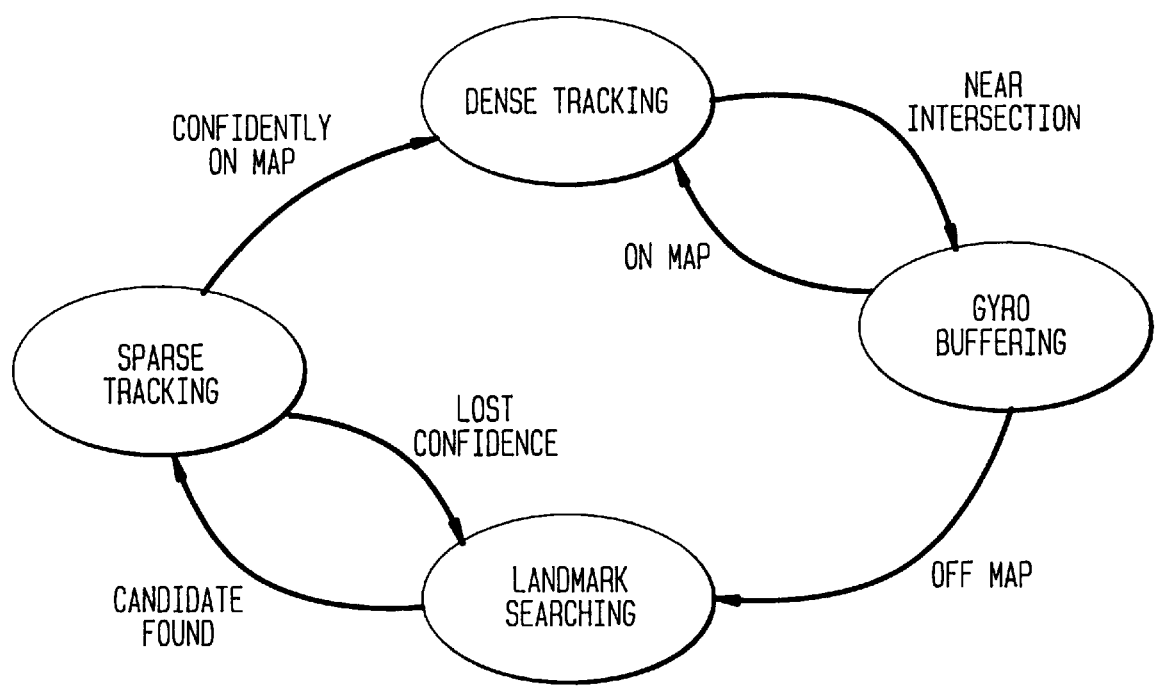
FIG. 17 is a flowchart for another embodiment of the invention.

Once the dense tracker operation is off map 69', it ceases normal operation and maintains a tally of the accumulated odometer 54 distance since departing from the route. This is fed as input to the sparse tracker portion of the system (along with the position at which the vehicle left the map). The sparse tracker examines the visual landmarks within the radius allowed by the accumulated odometer 54 readings to search for a return to the mapped database 69'. As described before, the sparse tracker maintains a set of location hypotheses and probabilities, which are updated whenever a landmark within that radius is recognized (correctly or incorrectly). When one of the location hypotheses has a much higher probability than the others, the vehicle is declared on-map at the corresponding position, and dense tracking is resumed. The flowchart of FIG. 17 shows the system operation for different events such as "off map", near intersection", "on map", and so forth.

Visual Incremental Turn Detector (Visual Gyroscope)

In the visual gyroscope 55, embodiment of the present invention, the present inventors conceived a method for computing an estimate of instantaneous turning of a vehicle, such as an automobile or robot, by using a sequence of images taken from a vehicle in motion, with the images being obtained from the processing of the image data strip 46 of FIG. 7. The estimate of instantaneous turning provides information indicative of the direction a vehicle is turning within a sequence of images. The estimate obtained is in this example used to detect the turns of an associated vehicle's course of travel, by integrating the instantaneous measurements over a short period of time. In this manner, the system is able to identify left-turns, right-turns, and u-turns, and to distinguish them from periods of time where the vehicle is heading in a straight line. When used in combination with the odometer 54, and a map display 53 of local streets, the system is able to show a vehicle's position on a map display 53 as the vehicle makes a journey, regardless of whether the vehicle is heading straight, or making turns. Alternatively, the visual gyroscope methodology, described in greater detail below, may be used to compute an estimate of the current heading of a vehicle, provided that the initial heading of the vehicle is known. Over the course of time, the error in estimating the heading may accumulate at a slow rate. However, when used with odometer 54, the visual gyroscope method of the present invention permits the system to estimate the vehicle's position for dead-reckoning, if required.

The method of the invention associated with the visual gyroscope embodiment will now be described in detail. The system begins the visual gyroscope calculation by extracting the image strips 46 from two successive images as described above. The computer 58 is also programmed to monitor the odometer 54 to determine how far the associated vehicle has travelled between the times that the extracted images were taken, and an internal clock (not shown) is used to determine the time intervals. In a prototype system of the present invention, the time interval ranges from 0.3 to 2 seconds, and the distance the vehicle has travelled is typically between 0 and 50 meters within the time interval.

The two extracted image strips are compared to estimate the amount of rotation the vehicle has undergone during the time interval between the two images. A range of possible rotations of the second strip are compared to the first strip to determine which rotation gives the best match. The range is determined from the distance and time intervals, in accordance with physical constraints upon how far a vehicle can turn in a given time and distance.

The best match between the first strip and rotations of the second is computed by the sum of the absolute value of the differences (SAVD). The rotation with the smallest match score is chosen as the correct match. For example, if rotating the second strip 15 degrees gives the best match to the first strip, then the vehicle is assumed to have turned 15 degrees during the interval between the images from which the strips came. An algorithm, given in pseudo-code for computing a turn increment, is as follows:

```
range_of_rotations = MIN(180,
    time_interval * max_degrees_per_second,
    distance_interval * max_degrees_per_meter)
best_match = infinity
for i = -range_of_rotations to +range_of_rotations:
    second_strip_rotated=rotate(second_strip,i)
    match = compute_SAVD(first_strip,
        second_strip_rotated)
    if match < best_match:
        best_match = match
        rotation = i
```

More specifically, the present method of computing the degree of turn between successive strips gives an estimate of the incremental turn. Note that typically it takes more than two successive images to complete a turn. Also, incremental turns are typically less than 15 degrees. However, the method is required to detect turns on the order of 90–180 degrees. The visual gyroscope of the present invention for providing a turn detector does so by integrating the incremental turn over a number of successive strips. In operating an engineering prototype of the present system on city streets, the inventors determined that turns may take up to 30 meters from start to finish. As a result, in one embodiment of the invention, the inventors integrate the results obtained from the visual gyroscope over distances of 30 meters. The odometer 54 provides information indicative of the completion of each 30 meter travel by the vehicle. For each new incremental turn reading, the system is programmed to add all incremental turns measured over the previous 30 meters to determine an integrated turning method. The integrated measurement is then rounded to the nearest 90 degrees, for permitting the detection of right, left, and u-turns substantially immediately after they are completed, thereby permitting the determination of the direction that the vehicle has turned at each intersection. An algorithm used in this embodiment of the invention to accomplish detection of the turn direction is shown below in pseudo-code:

```
complete_turn = 0
for i = current_odometer downto current_odometer-30:
    rotation = turn_increment(strip[i], strip[i-1])
    complete_turn = complete_turn + rotation
rounded_turn = round_to_nearest_90(complete_turn)
if rounded_turn = -180:
    output(U-turn)
if rounded_turn = -90:
    output(Left turn)
if rounded_turn = 90:
    output(Right turn)
if rounded_turn= 0:
    output (No turn)
```

In summation, to detect turns, small visual gyro 55, 55' readings are accumulated in memory for a distance of up to 30 meters (the empirical maximum length of a turn), in this example. Buffering or gyro reading accumulation is initiated when the current measured turn is at least 5 degrees, and the change in the odometer reading (in meters) is no more than the turn (in degrees). Turn data is continuously added to the buffer memory in computer 58 as long as either of the following two conditions hold:

1) The vehicle is not moving (the odometer 54 reads 0 meters and visual gyro 55 reports 0 degrees), or
2) All of the following hold:
   Accumulated odometer 54 readings (including the present one) since the start of buffering do not exceed 30 meters;

Either,
a) On the previous iteration, the magnitude of the turn (in degs) was at least equal to the distance travelled (in meters)
or b) The current measured turn is at least 5 degrees, and the change in the odometer 54 reading (in meters) is no more than the turn (in degrees).

Either,
a) The combination of the current and preceding turn measurements is at least 8 degrees in magnitude,
or b) Both of the following hold:
The total buffered turn (in degrees) is at least twice the total buffered distance (in meters).
The sum of the current and previous odometer changes are no more than 5 meters.

Once bufferings ends, the total accumulated visual gyro 55, 55' readings are taken from that period as being a "turn". In cases where all turns are expected to be at sharp angles, the sum of buffered angles is rounded to the nearest multiple of plus or minus 90 degrees.

The above turn detection algorithm, together with signals from odometer 54, is used to determine the position of the associated vehicle on a map shown on display 53 as the vehicle travels along the premapped route, such as a course laid out over city streets. Note that the system is initialized by having the vehicle begin at a known starting position. As previously indicated, odometer 54 provides signals indicative of the approximate distance the vehicle has travelled along portions of a street, for example, and such odometer signals are used to determine when the vehicle is close to an intersection. At each intersection, the present visual gyroscope or turn detector determines whether the vehicle has proceeded to go straight, turn right, turn left, or has made a u-turn. In this manner, the present system determines the location of the vehicle at all times. Note that the use of the skeleton map 71, in conjunction with the visual gyroscope 55, 55' embodiment of the invention is considered a preferred method of operating the present system.

An alternative embodiment of the present invention, where a map of the particular roadway a vehicle is to be tracked on is not available, dead-reckoning can be utilized in conjunction with the visual gyroscope embodiment of the invention. As with the preferred embodiment, the system is initialized with a known starting position, and also a known heading. Each successive computed turn increment is added to the previous heading to give a new heading. The new heading determines the direction of the vector corresponding to vehicle motion. The distance increment given by odometer 54 determines the length of that vector. The vector is added to the previous position to give the new position of the vehicle. In this manner, the vehicle's current position is estimated at all times.

Typically, dead-reckoning techniques are not as reliable as the aforesaid preferred technique incorporating a map of the vehicle route. Also, in dead-reckoning, the estimate of the current position is dependent upon the sum of all previous measurements. As a result, any errors made in the previous measurements will be cumulative, causing an increasing error over time. Accordingly, in using dead-reckoning it is not possible to realign estimates of the vehicle's position with the correct location. In contrast, when using the preferred map technique or method as described above, confining the vehicle's position to valid road positions prevents the error from becoming arbitrarily large, in that each valid position provides a correct location of the vehicle.

Lineal Position Tracking/Robotics

In addition to automatic tracking of the location of vehicles travelling along roadways, the present system is applicable for use with robots travelling along corridors in an indoor environment, for example. In applying the present system for use with robots, similar to the tracking of vehicles, target image strips are collected as the robot moves on a guided tour of an indoor environment over which it is to make subsequent duplicated trips. For example, in a prototype system, in a hall about 1.8 meters wide, images were spaced approximately every 10 cm as the robot moved down a trajectory that is nominally the center of the hall. For a hallway 50 meters long, for example, the resulting database, D, is an array of 500×360 entries.

The recognition operation for a robot moving along a hallway, and utilizing the present system, will now be described. As the robot moves along the hallway, it compiles an observation, O, over a "history window" of several of the same 1-dimensional strips, at intervals of the same nominal distance as the coded database. If one assumes a window size of five meters sampled at 10 cm intervals, the result is a history array of 50×360 pixels.

To extract the position and orientation of the robot, the following correlation function is used:

$$f_{D,O}(X, \theta) = \sum_{i=1}^{50} \sum_{j=1}^{360} |D_{X+i,(\theta+j) \bmod 360} - O_{i,j}| \quad (27)$$

and then look near the expected place $(\tilde{x}, \tilde{\theta})$ for the best fit, as follows:

$$<\tilde{x},\tilde{\theta}> = F(\tilde{x},\tilde{\theta}) = \operatorname{argmin}_{X,\theta}(f_{D,O}(x,\theta)) \quad (28)$$

The argmin is allowed to range over the rectangle $\tilde{x}-10 \leq x \leq \tilde{x}+10$ by $\tilde{\theta}-5 \leq \theta \leq \tilde{\theta}+5$ to provide that the database, D, is searched in this example a meter on both sides of the expected position, and 5° on either side of the expected heading. The match of least cost is taken to be the corrected best estimate of position and orientation. Kalman filtering improves this. Note x is the longitudinal position, and θ the orientation as indicated in equation "(27)".

If one assumes a dead reckoning error of 5% and a blind journey of 10 meters, a resultant error at the end of the journey of the robot is 50 cm. If one further assumes an accumulated orientation error of 0.2°/meter, the resultant build up in uncertainty is 2°. The present inventors recognize that the method herein suggested is operable as long as the step size of the robot (i.e. the blind journey length) is short enough to insure that the uncertainty in either of these dimensions does not exceed the space in the database that the system is capable of searching, and as long as the correlation function is unambiguous in that space. Although too small a search space is not desirable, too large a search space can also cause problems by producing spurious matches, in addition to requiring extra search time. However, engineering prototypes of robots including the present system have been shown to reliably operate in that even single real world images (i.e. observations of size 1×360) had sufficient uniqueness to result in the production of a single, sharp, and robust peak for each target image.

The same problems encountered in automatic tracking of the location of vehicles travelling along roadsides in an outside environment, can also cause problems in operating a robot indoors. The environmental changes may involve changes in the lighting conditions, changes in the appearance of the target images or scenery about the robot as it traverses hallways, for example, and the movement of transient objects in the vicinity of the robot, between the robot and the scenery in which it is attempting to extract targets for comparison with its database D. To reduce the effect of such problems, the history window of more than one image strip may be included in the observation O to ameliorate the effects of small or temporary changes. However, note that in operating a prototype robot at 1 meter/sec, the system required about 5 seconds to assemble a complete observation array, during which time it was observed that most disturbances fail to form any large block of data that correlates with incorrect parts of the database D.

To reduce the problem of major lighting changes in the environment of the robot, a multiplicity of databases, $D_1$, $D_2$, . . . , one for each condition which is not correctly handled by any of the others, may be utilized. The major problem encountered with such a multiple database source is in selecting the appropriate database at any given time for use in the correlation function. In this embodiment of the invention, the task is accomplished by calculating the set of scores, $S_i = f_{D_i}(\tilde{x}, \hat{\theta}, O)$, immediately before conducting a search, and taking the lowest $S_i$ score as evidence that $D_i$ is the best guess at the prevailing lighting conditions.

In the prototype robot system, operating in x(longitudinal position), y (lateral position), and θ (orientation) space, estimates of x and θ are obtained from the present system, while an estimate of y is obtained from another subsystem such as a sonar system well known for use in robots. These signals are applied to a Kalman filter in order to reduce the noise content associated with the signals indicative of position of the robot at a given time.

Equation "(28)" for extracting position and orientation, is shown for use with an indoor robot, but may also be used for extracting the position of a vehicle operating along a roadway. However, in the latter case, θ is a constant, and therefore it can be effectively eliminated from equations (27) and (28) for determining the position of the vehicle.

The computer 58 can be programmed for obtaining lineal position tracking using visual information, as indicated above, through use of the following pseudo-code:

```
# pseudo-code for position tracking using visual information

# italic names => initial values and/or static data
# bold names => get some information from the robot
# subscripts => refer to indices into arrays and matrices

best_estimate_x = initial_x
best_estimate_theta = initial_theta
D = pre_collected_database
label "START TRACKING LOOP"
current_move = 0
# Wait until we move 10cm
while current_move < 10cm
    current_move = current_move + odometer_change
# Take picture and put it in most recent entry of history window, O.
# Ignore (for simplicity) the issue of initially filling the history
window.
current_picture = take_picture
for i = 1 to 360
    O(1,i) = current_picture(i)
end
# Update best estimate with the latest movement
best_estimate_x = best_estimate_x + current_move
# Pick the best match between our history window and a region
# surrounding the best estimate in the database. This match becomes
# new best estimate.
best_match_score = a_really_big_number
# Search plus/minus 10 entries (1 meter) in the database.
for x = (best_estimate_x - 10) to (best_estimate_x + 10)
    # Search plus/minus a shift of 5 degrees.
    for theta = (best_estimate_theta - 5) to (best_estimate_theta + 5)
        current_score = 0
        # For entire history window . . .
        for i = 1 to 50
            # For all the degrees . . .
            for j = 1 to 360
                current_score = current_score +
                |D(x+i,(theta+j)mod 360) - O(i,j)|
            end
        end
        if current_score < best_match_score
            new_best_x = x
            new_best_theta = theta
            best_match_score = current_score
        end
    end
end
best_estimate_x = new_best_x
best_estimate_theta = new_best_theta
# Rotate the entries in the history window.
for i = 50 to 2 by -1
    for j = 1 to 360
        O(i,j) = O(i-1,j)
    end
end
goto "START TRACKING LOOP"
```

Although various embodiments of the present invention have been shown and described above, they are not meant to be limiting. For example, those of skill in the art may recognize various modifications to the embodiments shown, which modifications are meant to be covered by the spirit and scope of the invented claims.

What is claimed is:

1. A system for automatically tracking the location of a vehicle, comprising:

visual image detecting means mounted on said vehicle for obtaining analog image signals representative of at least a portion of a panoramic view of the surroundings about said vehicle;

digital signal processing means for converting said analog image signals into a plurality of successive digitized first image data strips as the associated vehicle travels along a route, each of said plurality of first image data strips including information relating to features of scenery about said vehicle at successive locations or landmarks along said route, respectively, whereby when said vehicle retraces travel along at least a portion of said route, said digital signal processing means converts resulting said analog image signals into successive digitized second image data strips corresponding to a unique one of said first image data strips, respectively;

sparse tracking means for utilizing selected ones of said plurality of first image data strips for establishing a sparse database thereof in memory, the selected image data strips representing substantially spaced apart successive locations along said route, said sparse tracking means further including landmark recognition means for comparing each of said second image data strips as they occur in real time with the ones of said first image data strips of the sparse database, respectively, for locating said vehicle in real time at the landmark or location associated with the one of said first image data strips most closely corresponding to the current said second image data strip;

dense tracking means for utilizing all of said plurality of first image data strips for establishing a dense database thereof in memory, representing adjacent successive locations along said route, said dense tracking means further including matching means for determining the closest match between each of said second image data strips as they occur in real time and said plurality of first image data strips, respectively, for locating said vehicle in real time at the location associated with the closest matching one of said first image data strips to the current second image data strip, said dense tracking means providing more accurate but less robust tracking of said vehicle than said sparse tracking means; and switching means responsive in one mode to straying of said vehicle from said route for transferring the tracking of said vehicle from said dense tracking means to said sparse tracking means, and thereafter responsive in another mode to said sparse tracking means recovering the location of said vehicle for at least a predetermined time, for transferring vehicle tracking back to said dense tracking means, and retaining said dense tracking means active as long as said vehicle continues travel on said route in a manner permitting said dense tracking means to locate said vehicle.

2. The system of claim 1, further including odometer means for providing odometer signals indicative of the distances travelled by said vehicle from a starting point on said route to locations or landmarks represented by said plurality of first image data strips, respectively.

3. The system of claim 2, further including means for tagging said first and second image data strips with associated odometer data from said odometer signals.

4. The system of claim 2, wherein said switching means further includes visual gyro means for detecting said vehicle either turning where it should not turn, or not turning where it should turn, for determining said vehicle has strayed from the intended route, and thereafter switching the tracking from said dense tracking means to said sparse tracking means.

5. The system of claim 4, further including means for navigating said vehicle through use of said odometer signals and dead reckoning, whenever during tracking with said sparse tracking means no landmarks are identified.

6. The system of claim 2, wherein said landmark recognition means further includes location probability modeling means for determining a landmark for locating said vehicle from amongst a plurality of possible landmarks, by computing for a current said second image data strip similarity scores with each of said first image data strips of the sparse database, respectively, with each landmark recognition result being represented by three numbers described by means for computing the gaussian amplitude representing the probability of the landmark recognition being correct, the gaussian mean representing the expected landmark location as expressed by an associated odometer signal, and the standard deviation of the gaussian distribution.

7. The system of claim 6, further including:

means for updating the vehicle location probabilities by shifting landmark locations by using odometer readings.

8. The method of claim 7, further including the step of including said labeled strips in a database for vehicle navigation.

9. The system of claim 2, further including visual incremental turn detector means for providing both said sparse tracking means, and said dense tracking means, signals indicative of the degree and direction of turns made by said vehicle as it retraces travel along said route.

10. The system of claim 9, wherein said visual incremental turn detector means includes:

means for extracting two successive second image data strips;

means for rotating the second occurring of said second image data strips until it matches the first occurring of said second image data strips, whereby the amount of rotation of the former to obtain a match with the latter is indicative of the degree the vehicle turned in the time interval between the two successive second image data strips.

11. The system of claim 10, wherein said visual incremental turn detector means further includes means responsive to said odometer signals for indicating the distance said vehicle travelled in making the turn increment or rotation measured between the successive two second image data strips.

12. The system of claim 11, wherein said visual incremental turn detector means further includes means responsive to the direction of rotation of the second occurring one of said second image data strips of successive pairs thereof, for indicating whether said vehicle is making or has made a left-turn, right-turn or u-turn.

13. The system of claim 11, wherein said visual incremental turn detector means further includes means receptive of both a signal indicative of the initial heading of said vehicle, and of signals from said turn direction means, for providing the heading of said vehicle at any given time.

14. The system of claim 13, wherein said direction responsive means includes means responsive to said vehicle heading in a straight path for indicating the end of a turn.

15. The system of claim 14, further including:

said extraction means including means for extracting each sequentially occurring pair of successive second image strips; and said rotating means including means for accumulating and summing the measured rotations and distances of each sequentially occurring pair of successive second image strips, for providing the total rotation made and distance travelled by the vehicle in turning.

16. The system of claim 15, wherein said rotating means further includes means indicating a u-turn, left-turn, right-turn or straight travel, if rounding of the accumulated measured rotations is −180°, −90°, +90°, or 0°, respectively.

17. The system of claim 16, further including:

a map display responsive to said odometer signals, and to said visual gyro means, for displaying the position of said vehicle thereon as it retraces travel along a premapped route, whereby said system is initialized by having said vehicle begin at a known starting position on said route.

18. The system of claim 16, further including dead reckoning means for extracting the current position of said vehicle at all times.

19. The system of claim 18, wherein said dead reckoning means includes:

means for initializing said system with a known starting position and a known heading;

means for adding each measured turn increment from said visual incremental turn detector means to the previous heading to obtain a new heading for determining the direction of a vector corresponding to vehicle motion; and means for adding each successive distance increment, measured by said odometer means between every two successive second image data strips, to said vector for the previous position of the vehicle, for obtaining the vehicle's current position.

20. The system of claim 9, wherein said dense tracking means further includes:

a means for determining the vehicle's orientation and lineal position by minimizing correlation scores between a current second image data strip and said first image data strips under a variety of hypothesized rotations and lineal positions.

21. The system of claim 20, further including:
means for updating the vehicle location by combining a current probability distribution for the vehicle location with an immediately prior probability distribution obtained from a previously recognized landmark.

22. The system of claim 2, wherein said matching means of said dense tracking means further includes:
probability determination means for calculating the probability a current second image data strip matches each of said plurality of first image data strips in said dense database, for determining whether a valid match exists between said current second image data strip and one of said plurality of first image data strips to locate said vehicle at that time.

23. The system of claim 22, wherein said probability determination means further includes:
means for estimating the probability a current odometer reading is correct, and combining the odometer probability with the probabilities obtained for each of said plurality of first image data strips to enhance the accuracy of locating said vehicle; and
visual incremental turn detector means for providing said dense tracking means with signals indicative of the degree and direction of turns made by said vehicle as it retraces travel along said route.

24. The system of claim 22, further including visual incremental turn detector means for providing said dense tracking means with signals indicative of the degree and direction of turns made by said vehicle as it retraces travel along said route.

25. The system of claim 1, wherein said sparse tracking means further includes:
a plurality of neural networks each assigned to a selected individual landmark to learn to recognize the one of said first image data strips associated with the selected one of said landmarks, respectively, whereby said sparse database consists of said plurality of neural networks; and
said landmark recognition means being operable to retrieve said neural networks from the sparse database to determine which one of said plurality of neural networks has the strongest recognition of a current second image data strip, whereby the associated first image data strip thereto provides an indication of the corresponding location of the vehicle.

26. The system of claim 1, further including:
said visual image detecting means including means for producing said analog image signals in colors representative of red, green, and blue values (RGB) of scenery about said vehicle; and
said digital signal processing means including means for producing each one of said first and second image data strips as both RGB color encoded strips and intensity encoded strips.

27. The system of claim 26, wherein said digital signal processing means further includes:
means for extracting from each one of said first and second images narrow bands of successive bins of pixels; and
means for computing the average intensity of each bin, for representing each one of said first and second image data strips as comprising the successive average intensities of the associated bins of pixels.

28. The system of claim 1, further including:
said visual image detecting means including means for producing said analog image signals in colors representative of red, green, and blue values (RGB) of scenery about said vehicle;
said digital signal processing means further including:
means dividing each one of said first and second image data strips into successive bins of pixels;
means for calculating the average color of each bin, for representing each one of said first and second image data strips as comprising the successive average color values of its associated bins of pixels.

29. The system of claim 1, further including:
said visual image detecting means including means for producing said analog image signals in colors representative of red, green, and blue values (RGB) of scenery about said vehicle;
said digital signal processing means further including:
means dividing each one of said first and second image data strips into successive bins of pixels; and
means for calculating the average of the brightest red, green, and blue values of the pixels in each bin, for identifying or representing each one of said first and second image data strips as comprising the successive average color brightness values of its associated bins of pixels.

30. The system of claim 1, further including:
said visual image detecting means including means for producing said analog image signals in colors representative of red, green, and blue values (RGB) of scenery about said vehicle;
said digital signal processing means further including:
means dividing each one of said first and second image data strips into successive bins of pixels; and
means for determining which pixel in each bin is the "most colorful", and assigning that value as representative of the bin, for identifying or representing each one of said first and second image data strips as comprising the successive "most colorful" pixels of its associated successive bins of pixels, whereby the "most colorful" pixel of each bin is determined as being that pixel of the bin having a color distance C the furthest from medium gray by Euclidean distance measure, with medium gray defined to have the RGB value of (127, 127, 127), and C being expressed as:

$$C = \sqrt{(R-127)^2 + (G-127)^2 + (B-127)^2}$$

where R, G, and B are the actual values for red, green, and blue.

31. The system of claim 1, wherein said sparse tracking means further includes:
image preprocessing means for extracting edge information as an edge strip from each one of, and for representing each of, said first and second image data strips, said landmark recognition means thereby operating for comparing the edge strip of each of said second image data strips with the edge strip of each of said first image data strips stored in said sparse database.

32. The system of claim 1, wherein said landmark recognition means includes an artificial neural network simulator, with each sparse landmark being assigned a unique neural network trained to recognize the landmarks.

33. The system of claim 32, further including:

means for tuning network weights for each said neural network in a supervised learning manner.

34. The system of claim 33, further including:

means for combining nearby gaussians for reducing the number of gaussians in said system; and means for eliminating gaussians having amplitudes below a predetermined value for reducing the number of gaussians in said system.

35. The system of claim 1, wherein said sparse tracking means includes automatic landmark selection means for selecting landmarks for the sparse database based upon considering locations each having the relatively smallest Euclidean distances with edge strips of locations within a predetermined distance of the considered location or landmark, and the relatively largest Euclidean distances with edge strips of locations outside of another predetermined distance from the considered location.

36. The system of claim 1, further including:

means for tracking arbitrary (but small) movements in said vehicles lineal position and orientation by finding a minimum correlation score across all hypothesized positions.

37. The system of claim 1, wherein said switching means further includes:

means for determining a minimum correlation score across said dense and sparse databases for switching between said dense tracking means and said sparse tracking means.

38. The system of claim 1, further including:

means for modeling said vehicle location via a mixture of gaussian distributions plus a background probability distribution.

* * * * *